US007340385B2

(12) United States Patent
James

(10) Patent No.: US 7,340,385 B2
(45) Date of Patent: Mar. 4, 2008

(54) METHOD AND PROGRAM STORAGE DEVICE FOR GENERATING GRIDS REPRESENTING THE ARCHITECTURE OF FLUVIAL RESERVOIRS

(75) Inventor: Robert A. James, Houston, TX (US)

(73) Assignee: Schlumberger Technology Corporation, Houston, TX (US)

( * ) Notice: Subject to any disclaimer, the term of this patent is extended or adjusted under 35 U.S.C. 154(b) by 677 days.

(21) Appl. No.: 10/459,050

(22) Filed: Jun. 11, 2003

(65) Prior Publication Data
US 2003/0233217 A1 Dec. 18, 2003

Related U.S. Application Data

(60) Provisional application No. 60/388,966, filed on Jun. 14, 2002.

(51) Int. Cl.
*G06G 7/48* (2006.01)
*B65G 23/04* (2006.01)
(52) U.S. Cl. .................. 703/10; 703/11; 198/835
(58) Field of Classification Search .............. 703/10; 702/11; 198/835
See application file for complete search history.

(56) References Cited

U.S. PATENT DOCUMENTS 5,835,882 A 11/1998 Vienot et al.
6,044,328 A * 3/2000 Murphy et al. ............. 702/11
6,052,520 A 4/2000 Watts, III
6,106,561 A 8/2000 Farmer

OTHER PUBLICATIONS

Holden et al., "Modeling of Fluvial Reservoirs with Object Models" 1998 International Association for Mathematical Geology. p. 473-496.*
Corbett-P.W.M., "Reservoir Geonomics—Focusing on the Essentials of Reservoir Geological Modelling" May 2002, Heriot-Watt Univ. p. 299-301.*
Akbar et al., "A Snapshot of Carbonate Reservoir Evaluation" May 2001. p. 20-42.*
Brian Willis, titled, "Palaeochannel Reconstructions from Point bar Deposits: a three-dimensional perspective" Dept. of Geological Sciences and Environment Studies SUNY Binghampton 1989 p. 757-766.*

(Continued)

*Primary Examiner*—David Vincent
*Assistant Examiner*—Tom Stevens
(74) *Attorney, Agent, or Firm*—Osha Liang LLP

(57) ABSTRACT

A method is disclosed for modeling a point bar associated with a multi-story channel belt, the method including: (a) in response to a plurality of rock classifications, generating a first two dimensional grid representing a grid of a top of the point bar and generating a second two dimensional grid representing a grid of a bottom of the point bar within the multi-story channel belt; and (b) in response to the first and second two dimensional grids representing the grid of the top and the bottom of the point bar, generating a three dimensional grid representing a volume of the point bar including the grid of the top of the point bar, the grid of the bottom of the point bar, and a grid of a side of the point bar.

37 Claims, 43 Drawing Sheets

OTHER PUBLICATIONS

Benes, B., et al. Layered Data Representation for Visual Simulation of Terrain Erosion. ITESM Campus Ciudad de Mexico. 2001, pp. 1-6. Download from http://citeseer.nj.nec.com/506000.html.

Broadhead, R. Elevator Basin Models—Implications for Exploration in Central New Mexico. Oil & Gas Journal. Jan. 22, 2001, vol. 99, No. 4, pp. 30-36.

Kwoun, O, et al. Variable Resolution Topographic Mapping of Ancient Fluvial Landscapes in Australia. 1998 IEEE International Geoscience and Remote Sensing Symposium. Jul. 1998, vol. 5, pp. 2360-2362.

Syversveen, A., et al. A Method for Approximate Fully Bayesian Analysis of Parameters. Norwegian University of Science and Technology. Sep. 1996, pp. 1-12. Download from http://citeseer.nj.nec.com.syversveen97method.html.

* cited by examiner $N_t$ = NUMBER OF WELLS PENETRATING CHANNEL UNIT
$n$ = 1+TOTAL NUMBER OF CONDITIONING WELLS PREVIOUSLY USED FOR THE CHANNEL UNIT

| | A | B | C | D | E | F | G | H | I | ... | AT | AU | AV |
|---|---|---|---|---|---|---|---|---|---|---|---|---|---|
| 1 | Well Name | Actual If in point bar,=1 | Model If in point bar,=1 | Match If match,=1 | Actual If in channel,=1 | Model If in channel,=1 | Match If match,=1 | Channel Unit Base | Top | | Channel Unit Base | Top | |
| 2 | | | | | | | | 22 | 12 | | | 20 | |
| 3 | 23 | 1 | 1 | 1 | | 0 | 1 | | | | | | |
| 4 | 7 | 1 | 0 | 0 | | 0 | 1 | | | | | | |
| 5 | 15 | 1 | 0 | 0 | | 0 | 1 | | | | | | |
| 6 | 3 | 1 | 0 | 0 | | 0 | 1 | | | | | | |
| 7 | 16 | 1 | 0 | 0 | | 0 | 1 | | | | 10 | 0 | |
| 8 | 28 | 1 | 0 | 0 | | 0 | 1 | | | | | | |
| 9 | 30 | 1 | 0 | 0 | | 0 | 1 | | | | | | |
| 10 | J | | 0 | 1 | | 0 | 0 | | | | | | |
| 11 | 5 | 1 | 0 | 0 | | 0 | 1 | | | | 10 | 0 | |
| 12 | 21 | | 0 | 1 | | 0 | 1 | | | | | | |
| 13 | 1 | | 0 | 1 | | 0 | 1 | | | | | | |
| 14 | 2 | | 0 | 1 | | 0 | 1 | | | | | | |
| 15 | 4 | | 0 | 1 | | 0 | 1 | | | | 10 | 0 | |
| 16 | 8 | | 0 | 1 | | 0 | 1 | | | | | | |
| 17 | 9 | | 0 | 1 | | 0 | 1 | | | | | | |
| 18 | 12 | | 0 | 1 | | 0 | 1 | | | | | | |
| 19 | 13 | | 0 | 1 | | 0 | 1 | | | | | | |
| 20 | 18 | | 0 | 1 | | 0 | 1 | | | | | | |
| 21 | 31 | | 0 | 1 | | 0 | 1 | | | | | | |
| 22 | A | | 0 | 1 | | 0 | 1 | | | | | | |
| 23 | B | | 0 | 1 | | 0 | 1 | | | | | | |
| 24 | C | | 0 | 1 | | 0 | 1 | | | | | | |
| 25 | D | | 0 | 1 | | 0 | 1 | | | | | | |
| 26 | E | | 0 | 1 | | 0 | 1 | | | | | | |
| 27 | F | 1 | 0 | 1 | | 0 | 1 | | | | | | |
| 50 | | | | | | | | | | | | | |
| 51 | | | | | | | | | | | | | |
| 52 | | | | | | | | | | | | | |
| 53 | Number correctly located | | | | Number correctly located | | | | | | | | |
| 54 | outside channels | | 0 | | outside channels | 0 | | | | | | | |
| 55 | | | | | | | | | | | | | |

Chart-Point Bar / Chart-Channel / Test - Point Bar / Test - Channel / Output Polygons / Output Data

| | A | B | C | D | E | W | X | Y | Z | AA | AB | AC | AD | AE | AF |
|---|---|---|---|---|---|---|---|---|---|---|---|---|---|---|---|
| 1 | Input polyline | | Independent | Interpolated Y | | | | X | Y | Input polyline | | Independent | Interpolated Y | | |
| 2 | Xmin | Ymin | X | Eq 1 | Eq 2 | Eq 20 | Eq 21 | selected | | Xmin | Ymin | X | Eq 1 | Eq 2 | Eq 3 |
| 3 | -53 | 283 | 0 | 268.9026 | FALSE | FALSE | FALSE | 268.9026 | | 58 | 2,872 | 0 | FALSE | FALSE | FALSE |
| 4 | 185 | 220 | 100 | 242.2473 | FALSE | FALSE | FALSE | 242.2473 | | 422 | 2,856 | 100 | 2870.202 | FALSE | FALSE |
| 5 | 564 | 46 | 200 | FALSE | 212.6628 | FALSE | FALSE | 212.6628 | | 818 | 2,683 | 200 | 2865.809 | FALSE | FALSE |
| 6 | 1,324 | -143 | 300 | FALSE | 166.9834 | FALSE | FALSE | 166.9834 | | 1,308 | 2,572 | 300 | 2861.416 | FALSE | FALSE |
| 7 | 1,909 | -49 | 400 | FALSE | 121.3039 | FALSE | FALSE | 121.3039 | | 1,640 | 2,698 | 400 | 2857.023 | FALSE | FALSE |
| 8 | 2,289 | 283 | 500 | FALSE | 75.62446 | FALSE | FALSE | 75.62446 | | 1,814 | 3,203 | 500 | FALSE | 2861.831 | FALSE |
| 9 | 2,479 | 883 | 600 | FALSE | 37.33666 | FALSE | FALSE | 37.33666 | | 2,194 | 3,377 | 600 | FALSE | 2777.978 | FALSE |
| 10 | 2,637 | 1,372 | 700 | FALSE | 12.39209 | FALSE | FALSE | 12.39209 | | 2,700 | 3,803 | 700 | FALSE | 2734.126 | FALSE |
| 11 | 2,890 | 1,530 | 800 | FALSE | -12.5525 | FALSE | FALSE | -12.5525 | | 3,191 | 3,930 | 800 | FALSE | 2690.274 | FALSE |
| 12 | 3,397 | 1,372 | 900 | FALSE | -37.497 | FALSE | FALSE | -37.497 | | 3,571 | 4,056 | 900 | FALSE | FALSE | 2664.0 |
| 13 | 4,219 | 1,056 | 1000 | FALSE | -62.4416 | FALSE | FALSE | -62.4416 | | 3,935 | 3,390 | 1000 | FALSE | FALSE | 2641.4 |
| 14 | 4,947 | 978 | 1100 | FALSE | -87.3862 | FALSE | FALSE | -87.3862 | | 4,093 | 3,551 | 1100 | FALSE | FALSE | 2618.9 |
| 15 | 5,422 | 1,104 | 1200 | FALSE | -112.331 | FALSE | FALSE | -112.331 | | 4,330 | 3,298 | 1200 | FALSE | FALSE | 2596.3 |
| 16 | 6,166 | 1,420 | 1300 | FALSE | -137.275 | FALSE | FALSE | -137.275 | | 4,615 | 3,409 | 1300 | FALSE | FALSE | 2573.8 |
| 17 | 6,672 | 1,562 | 1400 | FALSE | -130.925 | FALSE | FALSE | -130.925 | | 4,852 | 3,898 | 1400 | FALSE | FALSE | FALSE |
| 18 | 7,178 | 1,735 | 1500 | FALSE | -114.774 | FALSE | FALSE | -114.774 | | 4,995 | 4,056 | 1500 | FALSE | FALSE | FALSE |
| 19 | 7,368 | 2,067 | 1600 | FALSE | -98.623 | FALSE | FALSE | -98.623 | | 5,485 | 4,008 | 1600 | FALSE | FALSE | FALSE |
| 20 | 7,574 | 2,462 | 1700 | FALSE | -82.4718 | FALSE | FALSE | -82.4718 | | 5,881 | 4,056 | 1700 | FALSE | FALSE | FALSE |
| 21 | 8,049 | 2,588 | 1800 | FALSE | -66.3205 | FALSE | FALSE | -66.3205 | | 5,992 | 4,514 | 1800 | FALSE | FALSE | FALSE |
| 22 | 8,840 | 2,635 | 1900 | FALSE | -50.1693 | FALSE | FALSE | -50.1693 | | 6,150 | 4,956 | 1900 | FALSE | FALSE | FALSE |
| 23 | 9,473 | 2,683 | 2000 | FALSE | 30.54169 | FALSE | FALSE | 30.54169 | | 6,482 | 5,192 | 2000 | FALSE | FALSE | FALSE |
| 24 | 9,995 | 2,746 | 2100 | FALSE | 117.87 | FALSE | FALSE | 117.87 | | 7,147 | 5,192 | 2100 | FALSE | FALSE | FALSE |
| 25 | | | 2200 | FALSE | 205.1983 | FALSE | FALSE | 205.1983 | | 7,732 | 4,924 | 2200 | FALSE | FALSE | FALSE |
| 26 | | | 2300 | FALSE | 317.5552 | FALSE | FALSE | 317.5552 | | 8,349 | 4,892 | 2300 | FALSE | FALSE | FALSE |
| 27 | | | 2400 | FALSE | 633.3711 | FALSE | FALSE | 633.3711 | | 9,045 | 5,003 | 2400 | FALSE | FALSE | FALSE |
| 28 | | | 2500 | FALSE | 947.8199 | FALSE | FALSE | 947.8199 | | 9,710 | 5,066 | 2500 | FALSE | FALSE | FALSE |
| 29 | | | 2600 | FALSE | 1257.151 | FALSE | FALSE | 1257.151 | | 9,916 | 5,114 | 2600 | FALSE | FALSE | FALSE |
| 30 | | | 2700 | FALSE | 1411.245 | FALSE | FALSE | 1411.245 | | 10,042 | 5,161 | 2700 | FALSE | FALSE | FALSE |
| 31 | | | 2800 | FALSE | 1473.584 | FALSE | FALSE | 1473.584 | | | | 2800 | FALSE | FALSE | FALSE |
| 32 | | | 2900 | FALSE | 1526.866 | FALSE | FALSE | 1526.866 | | | | 2900 | FALSE | FALSE | FALSE |
| 33 | | | 3000 | FALSE | 1495.697 | FALSE | FALSE | 1495.697 | | | | 3000 | FALSE | FALSE | FALSE |

FIG.32

|    | A | B | C | D | E | F | G | H | I |
|----|---|---|---|---|---|---|---|---|---|
| 1  | Channel Parameters | | | | Well Name | X | Y | Base CB(C) | Facies (C) |
| 2  | Base Radius | 500 | | | 23 | 6401.4704 | 3158.1912 | 22 | Point Bar |
| 3  | Variation in Radius | 0.1 | | | 7 | 3145.5968 | 2019.4584 | 21 | Point Bar |
| 4  | Channel Width | 100 | | | 15 | 5043.5864 | 3866.8512 | 21 | Point Bar |
| 5  | Variation in Channel Width | 0.1 | | | 3 | 2116.592 | 3208.788 | 19 | Point Bar |
| 6  | Wiggle Control | 1.5 | | | 16 | 5043.5864 | 3158.1912 | 19 | Point Bar |
| 7  | Channelbelt Thickness | 24 | | | 28 | 7084.5272 | 1892.9664 | 19 | Point Bar |
| 8  | Channel Unit Thickness | 10 | | | 30 | 7767.8888 | 3158.1912 | 19 | Point Bar |
| 9  | Depth to Top Channelbelt | 0 | | | J | 2156.47 | 515.88 | 19 | Point Bar |
| 10 | Depth to Base Channelbelt | 24 | | | 5 | 2859.0848 | 2580.0344 | 16 | Channel |
| 11 | Depth to Top Channel Unit | 0 | | | 21 | 6173.7848 | 4676.4 | 14 | Point Bar |
| 12 | Depth to Base Channel Unit | 10 | | | 1 | 2116.592 | 4617.2688 | | Floodplain |
| 13 | Conditioned Well | | | | 2 | 2116.592 | 3908.9136 | | Floodplain |
| 14 | X | 6401.47 | | | 4 | 2850.5504 | 4288.3896 | | Floodplain |
| 15 | Y | 3158.191 | | | 8 | 3255.3248 | 4954.6824 | | Floodplain |
| 16 | | | | | 9 | 3744.5288 | 4516.0752 | | Floodplain |
| 17 | | | | | 12 | 4275.7952 | 4221.0288 | | Floodplain |
| 18 | | | | | 13 | 4275.7952 | 3504.1392 | | Floodplain |
| 19 | Channelbelt Limits | | | | 18 | 5692.8104 | 4221.0288 | | Floodplain |
| 20 | X max | Y max | Y min | | 31 | 7767.8888 | 2441.3016 | | Floodplain |
| 21 | 0 | 0 | 268.9026 | | A | 383.55 | 5720.39 | | Floodplain |
| 22 | 100 | 2870.202 | 242.2473 | | B | 4789.18 | 5420.62 | | Floodplain |
| 23 | 200 | 2865.809 | 212.6628 | | C | 8280.41 | 5324.1 | | Floodplain |
| 24 | 300 | 2861.416 | 166.9834 | | D | 9624.07 | 5697.48 | | Floodplain |
| 25 | 400 | 2857.023 | 121.3039 | | E | 8266.44 | 1999.24 | | Floodplain |
| 26 | 500 | 2821.831 | 75.62446 | | F | 9403.09 | 322.84 | | Floodplain |
| 27 | 600 | 2777.978 | 37.33666 | | G | 6410.97 | 1139.45 | | Floodplain |
| 28 | 700 | 2734.126 | 12.39209 | | H | 4941.58 | 377.45 | | Floodplain |
| 29 | 800 | 2690.274 | -12.5525 | | I | 2794.01 | 1291.85 | | Floodplain |
| 30 | 900 | 2664.003 | -37.497 | | N | 1283.98 | 2857.76 | | Floodplain |
| 31 | 1000 | 2641.467 | -62.4416 | | O | 605.8 | 4021.08 | | Floodplain |
| 32 | 1100 | 2618.931 | -87.3862 | | | | | | |
| 33 | 1200 | 2596.394 | -112.331 | | | | | | |

FIG.33

| | A | B | C | D | E | F | G | H | I | AT | AU | AV |
|---|---|---|---|---|---|---|---|---|---|---|---|---|
| 1 | | | | | | | | Channel Unit | 1 | Channel Unit | 20 | |
| 2 | Well Name | Actual If in point bar,=1 | Model If in point bar,=1 | Match If match,=1 | Actual If in channel,=1 | Model If in channel,=1 | Match If match,=1 | Base | Top | Base | Top | |
| 3 | 23 | 1 | 1 | 1 | | 0 | 1 | 22 | 12 | | | |
| 4 | 7 | 1 | 0 | 0 | | 0 | 1 | | | 10 | 0 | |
| 5 | 15 | 1 | 0 | 0 | | 0 | 1 | | | | | |
| 6 | 3 | 1 | 0 | 0 | | 0 | 1 | | | 10 | 0 | |
| 7 | 16 | 1 | 0 | 0 | | 0 | 1 | | | | | |
| 8 | 28 | 1 | 0 | 0 | | 0 | 1 | | | 10 | 0 | |
| 9 | 30 | 1 | 0 | 0 | | 0 | 1 | | | | | |
| 10 | J | | 0 | 0 | | 0 | 0 | | | | | |
| 11 | 5 | | 0 | 1 | | 0 | 1 | | | | | |
| 12 | 21 | 1 | 0 | 0 | | 0 | 1 | | | | | |
| 13 | 1 | | 0 | 1 | | 0 | 1 | | | | | |
| 14 | 2 | | 0 | 1 | | 0 | 1 | | | | | |
| 15 | 4 | | 0 | 1 | | 0 | 1 | | | | | |
| 16 | 8 | | 0 | 1 | | 0 | 1 | | | | | |
| 17 | 9 | | 0 | 1 | | 0 | 1 | | | | | |
| 18 | 12 | | 0 | 1 | | 0 | 1 | | | | | |
| 19 | 13 | | 0 | 1 | | 0 | 1 | | | | | |
| 20 | 18 | | 0 | 1 | | 0 | 1 | | | | | |
| 21 | 31 | | 0 | 1 | | 0 | 1 | | | | | |
| 22 | A | | 0 | 1 | | 0 | 1 | | | | | |
| 23 | B | | 0 | 1 | | 0 | 1 | | | | | |
| 24 | C | | 0 | 1 | | 0 | 1 | | | | | |
| 25 | D | | 0 | 1 | | 0 | 1 | | | | | |
| 26 | E | | 0 | 1 | | 0 | 1 | | | | | |
| 27 | E | | 0 | 1 | | 0 | 1 | | | | | |
| 50 | | | | | | | | | | | | |
| 51 | | | | | | | | | | | | |
| 52 | | | | | | | | | | | | |
| 53 | Number correctly located outside channels | | 0 | | Number correctly located outside channels | 0 | | | | | | |
| 54 | | | | | | | | | | | | |
| 55 | | | | | | | | | | | | |

FIG.34

```
!CPS_VERSION_6.0 T=98
!----------------------M1BACH "Create" Request ----------
! This is file FRAMEWORK, a batch macro written by M1BACH.
!----------------------------------------------
M1OPEN "DA" "D1" "UNKNOWN"
!....
M1OPEN "DA" "D1" "UNKNOWN"
!...
M1OPEN "DA" "D1" "UNKNOWN"
FDASCI 0 2 "Computed" 0 1E30 0
F1TRAS "," .
FDATTR 1 2 2 0
FDATNM 1 "," "," "," ","
FDAFIL 3 0 0
M1ASCI "d" "," "¡" "/home/oregon/rt3/channels/Book2.txt"
!...
M1OPEN "DA" "D2" "UNKNOWN"
!...
M1OPEN "DA" "D2" "UNKNOWN"
FDASCI 0 2 "Computed" 0 1E30 0
F1TRAS "," .
FDATTR 1 2 2 0
FDATNM 1 "," "," "," ","
FDAFIL 3 0 0
M1ASCI "d" "," "¡" "/home/oregon/rt3/channels/Book2.txt"
!...
M1OPEN "DA" "D3" "UNKNOWN"
!...
```

*FIG.39*

```
!CPS_VERSION_6.0 T=98
!----------------M1BACH "Create" Request --------------
! This is file VOLUMETRICS, a batch macro written by M1BACH.
! ----------------------------------------------------
M1OPEN "SA" "D1_PB_isochore" "OLD"
!...
M1OPEN "F" "null" "OLD"
!...
M1OPEN "P" "null" "OLD"
!...
M1OPEN "SA" "D1_PB_isochore" "OLD"
!...
M1OPEN "F" "null" "OLD"
!...
M1OPEN "P" "null" "OLD"
!...
M1OPEN "SA" "D1_PB_isochore" "OLD"
!...
M1OPEN "F" "null" "OLD"
!...
M1OPEN "P" "null" "OLD"
!...
M1OPEN "SA" "D1_PB_isochore" "OLD"
!...
M1OPEN "F" "null" "OLD"
!...
M1OPEN "P" "null" "OLD"
!...
M1OPEN "SA" "D1_PB_isochore" "OLD"
M1OPEN "F" "null" "OLD"
M1OPEN "P" "null" "OLD"
F1CONF 0 INDT INDT 1
FSVALG 1 4 0 0
FSVSCL 1 1
FSVREP "" "/home/oregon/rt2/channels/CHANNELS/CPS/rjames.vlm" "" 1
FSVSLI 0 0
MSVOLM
```

```
(General)                                            Vol_Import

Sub Vol_Import ()
'
' Vol_Import Macro
' Macro recorded 4/19/2002 by SLB
'
' Keyboard Shortcut: Ctrl+Shift+V
'
    ChDir "\\Texas\oregon rt3\channels\CHANNELS\CPS"
    Workbooks.OpenText Filename:= _
        "\\Texas\oregon rt3\channels\CHANNELS\CPS\rjames.vlm", Origin:=xlWindows, _
        StartRow:=1, DataType:=xlDelimited, TextQualifier:=xlDoubleQuote, _
        ConsecutiveDelimiter:=False, Tab:=False, Semicolon:=False, Comma:=True _
        , Space:=false, Other:=False, FieldInfo:=Array(Array(1, 1), Array(2, 1) _
        , Array(3, 1), Array(4, 1), Array(5, 1), Array(6, 1), Array(7, 1), Array(8, 1), Array(9, 1), _
        Array(10, 1), Array(11, 1), Array(12, 1), Array(13, 1), Array(14, 1), Array(15, 1))
    Columns("B:J").Select
    Range("J1").Activate
    Selection.Delete Shift:=xlToLeft
    Columns("D:F").Select
    Selection.Delete Shift:=xlToLeft
    Columns("A:C").Select
    Selection.Columns.AutoFit
    Rows(":1").Select
    Selection.Insert Shift:=xlDown
    Range("A1").Select
    ActiveCell.FormulaR1C1 = "Surface"
    Range("B1").Select
    ActiveCell.FormulaR1C1 = "Volume"
    Range("C1").Select
    ActiveCell.FormulaR1C1 = "Area"
    Rows("2:2").Select
    Selection.Insert Shift:=xlDown
    Range("B2").Select
    ActiveCell.FormulaR1C1 = "(Cu. M)"
    Range("B2").Select
    ActiveCell.FormulaR1C1 = "(Cu. m)"
    Range("C2").Select
    ActiveCell.FormulaR1C1 = "(Sq. m)"
```

Project - VBAProject
- Module13
- Module14
- Module15
- Module16
- Module17
- Module18
- Module19
- Module2
- Module20
- Module21
- Module22

Properties-Module22
Module22 Module
Alphabetic | Categorized
(Name) Module22

|   | A | B | C |
|---|---|---|---|
| 1 |   | Volume | Area |
| 2 | Surface | (Cu. m) | (Sq. m) |
| 3 | D1_PB_isochore[381817143] | 1.383E+07 | 2.196E+06 |
| 4 | D2_PB_isochore[381817652] | 1.141E+07 | 3.086E+06 |
| 5 | D3_PB_isochore[381817685] | 6.487E+06 | 2.835E+06 |
| 6 | D4_PB_isochore[381816996] | 7.332E+06 | 2.888E+06 |
| 7 | D5_PB_isochore[381817891] | 1.189E+07 | 2.870E+06 |
| 8 | D6_PB_isochore[381817700] | 9.531E+06 | 2.909E+06 |
| 9 | D7_PB_isochore[381817191] | 1.205E+07 | 2.432E+06 |
| 10 | D8_PB_isochore[381817190] | 2.084E+07 | 1.575E+06 |
| 11 | D9_PB_isochore[381816917] | 7.204E+06 | 2.005E+06 |
| 12 | D10_PB_isochore[381818452] | 1.277E+07 | 2.899E+06 |
| 13 | D11_PB_isochore[381817723] | 2.917E+07 | 3.523E+06 |
| 14 | D12_PB_isochore[381816834] | 2.281E+07 | 3.071E+06 |
| 15 | D13_PB_isochore[381816883] | 1.653E+07 | 3.110E+06 |
| 16 | D14_PB_isochore[381817320] | 3.521E+07 | 4.166E+06 |
| 17 | D15_PB_isochore[381818767] | 2.940E+07 | 2.519E+06 |
| 18 | D16_PB_isochore[381818126] | 5.000E+07 | 2.896E+06 |
| 19 | D17_PB_isochore[381818335] | 3.622E+07 | 3.089E+06 |
| 20 | D18_PB_isochore[381818268] | 6.157E+07 | 4.398E+06 |
| 21 | D19_PB_isochore[381818813] | 0.000E+00 | 1.016E+06 |
| 22 | D20_PB_isochore[381818842] | 0.000E+00 | 1.106E+06 |
| 23 | CB_base [2056514667] | 4.037E+08 | 2.503E+07 |
| 24 |   |   |   |

\rjames/

METHOD AND PROGRAM STORAGE DEVICE FOR GENERATING GRIDS REPRESENTING THE ARCHITECTURE OF FLUVIAL RESERVOIRS

CROSS REFERENCE TO RELATED APPLICATIONS

This is a Utility Application of prior pending Provisional Application Ser. No. 60/388,966 filed Jun. 14, 2002 entitled "Method for generating grids to represent fluvial sand bodies".

BACKGROUND OF THE INVENTION

The subject matter of the present invention relates to a method and program storage device for generating grids representing the architecture of fluvial reservoirs.

Shale or other fine grained rock in a reservoir represents a barrier to the flow of oil or gas in the reservoir because the shale or other fine grain rock will inhibit the flow of the oil or gas in the reservoir. On the other hand, sand in a reservoir does not represent a barrier because the sand will not inhibit the flow of the oil or gas in the reservoir. Therefore, in reservoir development, there is a concern regarding the three dimensional distribution in the reservoir of the shale or other fine grained rock because the shale and/or fine grain rock will impede the movement of fluids in the reservoir. As a result, in order to plan development of oil or gas from the reservoir, there is a need to predict the specific locations in the reservoir where the shale and/or fine grain rock exists.

Accordingly, when modeling a reservoir for development planning, there exists a need to predict the specific locations in the reservoir where the shale or fine grain rock is located.

SUMMARY OF THE INVENTION

A first aspect of the present invention includes a method for modeling a point bar associated with a multi-story channel belt, comprising: (a) in response to a plurality of rock classifications, generating a first two dimensional grid representing a grid of a top of the point bar and generating a second two dimensional grid representing a grid of a bottom of the point bar within the multi-story channel belt; and (b) in response to the first and second two dimensional grids representing the grid of the top and the bottom of the point bar, generating a three dimensional grid representing a volume of the point bar including the grid of the top of the point bar, the grid of the bottom of the point bar, and a grid of a side of the point bar.

Another aspect of the present invention includes a computer program adapted to be executed by a processor, the computer program, when executed by the processor, conducting a process for modeling a point bar associated with a multi-story channel belt, the process comprising: (a) in response to a plurality of rock classifications, generating a first two dimensional grid representing a grid of a top of the point bar and generating a second two dimensional grid representing a grid of a bottom of the point bar within the multi-story channel belt; and (b) in response to the first and second two dimensional grids representing the grid of the top and the bottom of the point bar, generating a three dimensional grid representing a volume of the point bar including the grid of the top of the point bar, the grid of the bottom of the point bar, and a grid of a side of the point bar.

Another aspect of the present invention includes a program storage device readable by a machine and tangibly embodying a set of instructions executable by the machine to perform method steps for modeling a point bar associated with a multi-story channel belt, the method steps comprising: (a) in response to a plurality of rock classifications, generating a first two dimensional grid representing a grid of a top of the point bar and generating a second two dimensional grid representing a grid of a bottom of the point bar within the multi-story channel belt; and (b) in response to the first and second two dimensional grids representing the grid of the top and the bottom of the point bar, generating a three dimensional grid representing a volume of the point bar including the grid of the top of the point bar, the grid of the bottom of the point bar, and a grid of a side of the point bar.

Another aspect of the present invention includes a system adapted for modeling a point bar associated with a multi-story channel belt, comprising: means responsive to a plurality of rock classifications for generating a first two dimensional grid representing a grid of a top of the point bar and generating a second two dimensional grid representing a grid of a bottom of the point bar within the multi-story channel belt; and means responsive to the first and second two dimensional grids representing a grid of the top and the bottom of the point bar for generating a three dimensional grid representing a volume of the point bar including the grid of the top of the point bar, the grid of the bottom of the point bar, and a grid of a side of the point bar.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented herein below, and the accompanying drawings, which are given by way of illustration only and are not intended to be limitative of the present invention, and wherein:

FIG. 16 which includes

FIGS. 19A and 19B, illustrate the method embodied in the ChannelMod software for testing the validity of each model realization;

Figure 20A:
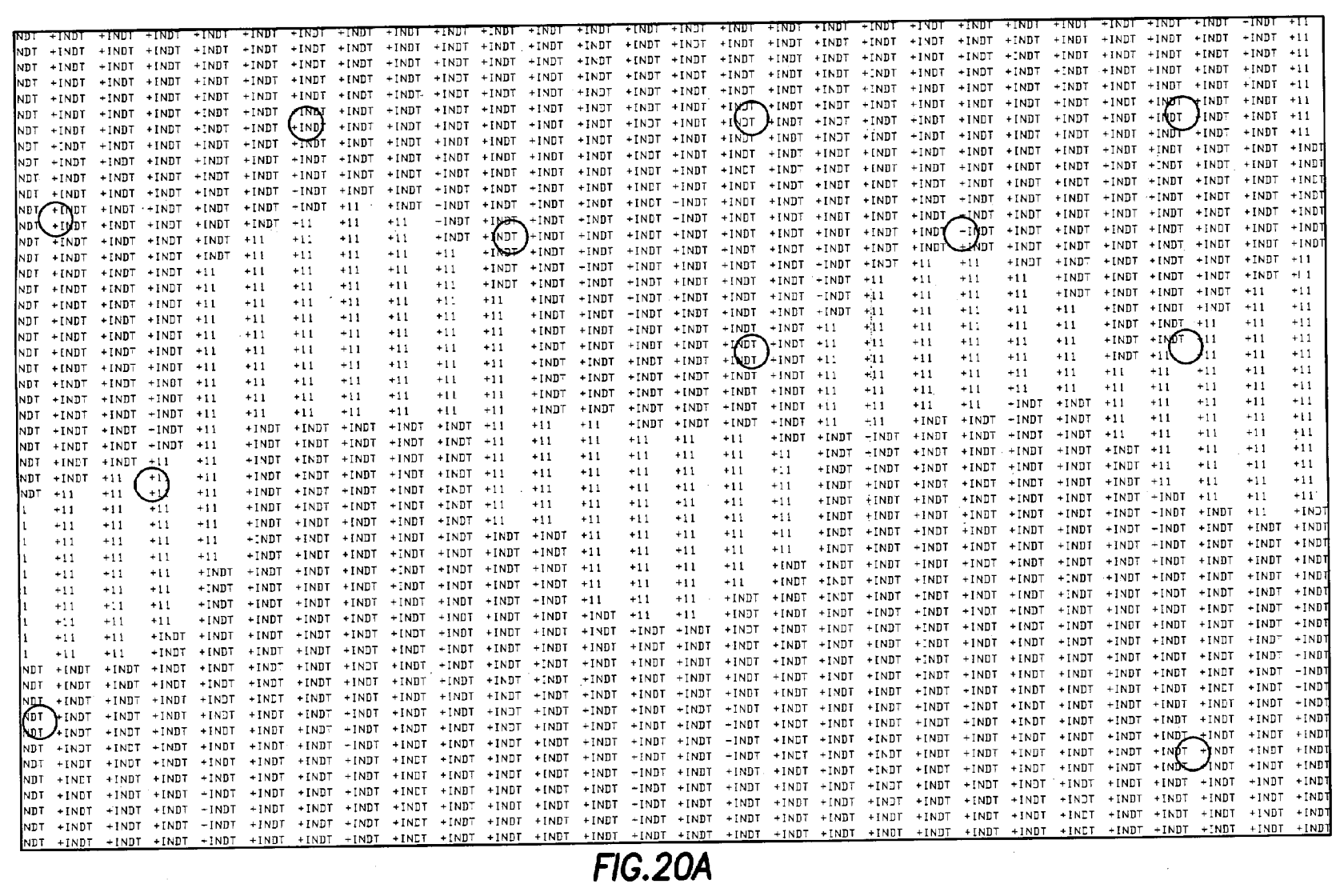
Figure 20B:
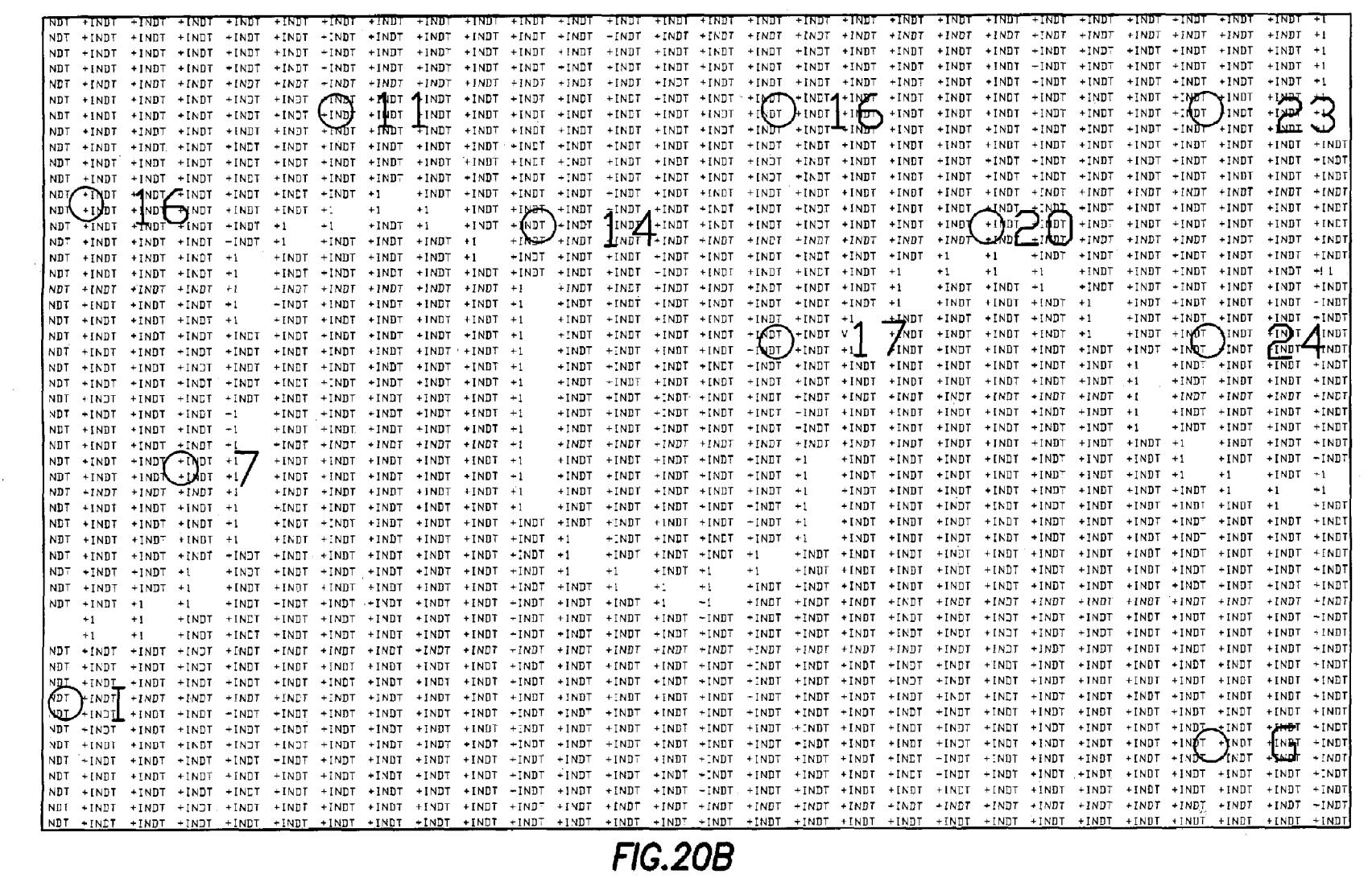

FIG. 20, which includes FIGS. 20A and 20B, and FIG. 21, which includes FIGS. 21A and 21B, illustrate the grids generated by the ChannelMod software;

FIGS. 24 through 45 are referenced in the 'Detailed Description of the Invention' section of this specification, wherein:

FIG. 24 illustrates an Aerial view of a modern channel belt;

FIG. 25 illustrates a Conceptual model of a channel belt, as applied in ChannelMod;

FIG. 26 illustrates Control on amount of base level rise;

FIG. 27 illustrates a Schematic representation showing the logic of simulating successive channel units to fit wells with progressively shallower channel unit bases;

FIG. 28 illustrates a definition in terms of circles;

FIG. 29 illustrates a depiction of the ChannelModeling process;

FIG. 30 illustrates a Chart depicting a Point Bar sheet showing one simulation of the channel course and point bar locations;

FIG. 31 illustrates a CPS-3 base map showing channel belt margins in purple, wells within channels in white and wells outside channels as red circles;

FIG. 32 illustrates an Input Polyline worksheet;

FIG. 33 illustrates an Input Parameters worksheet;

FIG. 34 illustrates a Test-Point Bar worksheet;

FIG. 35 illustrates a first part of macro "Export2" in workbook Export.xls;

FIG. 36 illustrates a First dialogue box to appear after macro "Export2" has created text files Book1.txt to Book40.txt;

FIG. 37 illustrates a third dialogue box to appear after macro "Export2" has created text files Book1.txt to Book40.txt.

FIG. 38 illustrates a Dialogue box that appears when macro "Export2" has finished running;

FIG. 39 illustrates a First part of macro "FRAMEWORK" in the CPS directory;

FIG. 40 illustrates a Map of channels and point bars generated in CPS-3 by macro "Map";

FIG. 41 illustrates a Model Editor window showing how polygon (yellow) can be defined for adding a value of −1 to all grid values within the polygon;

FIG. 42 illustrates Structure contours on base of channel belt;

FIG. 43 illustrates the First part of macro "VOLUMETRICS" in the CPS directory;

FIG. 44 illustrates the First part of macro "Vol_Import" in workbook ChannelMod*.xls; and FIG. 45 illustrates a Workbook Vol_Table, generated by macro "Vol_Import".

DESCRIPTION OF THE INVENTION

As rivers meander across a floodplain, they deposit sediments on the inside bank of each meander loop. The resulting accumulation of sand or gravel, together with minor proportions of mud, is known as a "point bar". As the meandering process continues, the meander loops move in a downstream direction, such that sediment is continually eroded from the upstream edge of each point bar and deposited at the downstream edge. This process continues until the river changes course upstream, at which point the channel is abandoned. The abandoned meander loops then become "oxbow lakes" that eventually fill with mud. At some later time, an active river channel might return to the area as a result of further changes in course; this new channel will tend to erode away all or part of the earlier-formed point bars and channel mud fills. However, continuing subsidence will reduce the severity of this erosion. The end result of a long period of river flow is the deposition of a "channel belt" containing a complex spatial distribution of partly preserved point bars, channel mud fills and the predominantly muddy sediments of the floodplain.

After burial under a sediment overburden, channel belts can become filled with oil or gas to become "fluvial reservoirs" in oil or gas fields. In such reservoirs, the point bars provide storage capacity for the oil or gas and also a conduit for fluid movement, while the channel mud fills, now lithified to shale, act as barriers to the movement of oil or gas.

Since fluvial reservoirs do not comprise or include uniform slabs of sand, there exists in each such reservoir a plurality of curvilinear lines of shale (the channel mud fills) that can badly affect the production of oil or gas from the reservoir. The 'method and program storage device' of the present invention 'for generating grids representing the architecture of fluvial reservoirs' will predict the specific locations in the oil or gas reservoir where the plurality of curvilinear lines of mud will exist. These locations of the curvilinear channel mud fills in the reservoir will be displayed on a 'computer representation of the reservoir' which is generated as an output display by the present invention.

The aforementioned 'computer representation of the reservoir' is actually a model of the 'heterogeneity' of the oil or gas reservoir.

Figure 1:
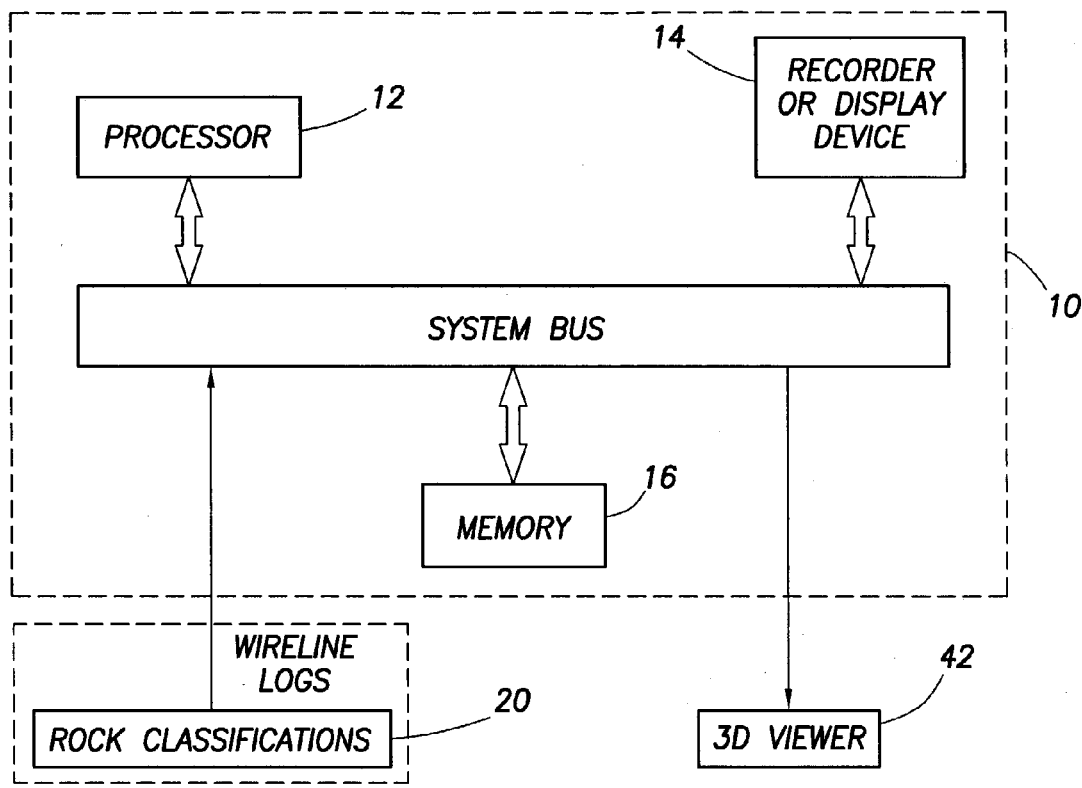
FIGS. 1 and 2 illustrates a workstation or personal computer that stores the ChannelMod software of the present invention which receives rock classifications as input data and generates a computer model representation of grids that represent the architecture of fluvial reservoirs.

Referring to FIG. 1, a workstation or other computer system, which stores the ChannelMod software of the present invention for generating grids representing the architecture of fluvial reservoirs, is illustrated. In FIG. 1, a computer system 10 includes a processor 12 operatively connected to a system bus, a recorder or display device 14 operatively connected to the system bus, and a memory 16 operatively connected to the system bus.

Figure 2:
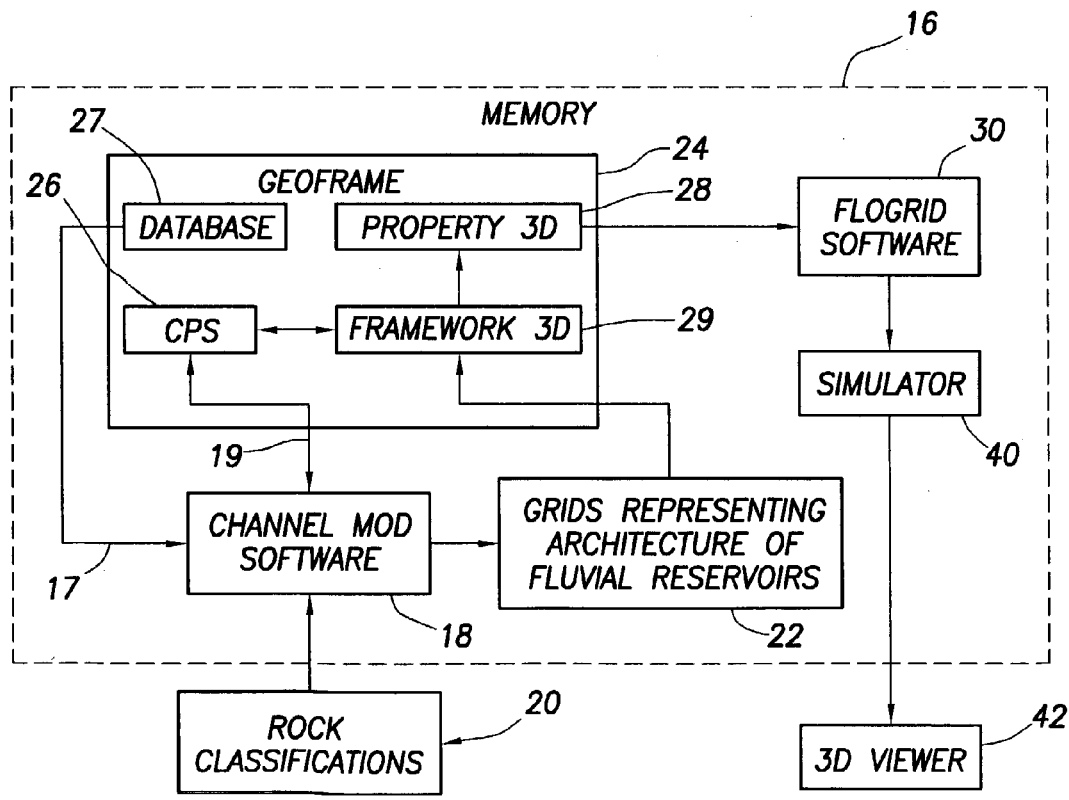

Referring to FIG. 2, the memory 16 is adapted to store a 'ChannelMod' software 18 in accordance with the present invention. The 'ChannelMod' software 18 is initially stored on a CD-Rom or other program storage device, the 'ChannelMod' software 18 being loaded from the CD-Rom into the memory 16 of the computer system 10 for storage therein. The computer system 10 may be a personal computer (PC), a workstation, or a mainframe. Examples of possible workstations include a Silicon Graphics Indigo 2 workstation or a Sun SPARC workstation or a Sun ULTRA workstation or a Sun BLADE workstation. The memory 16 is a computer readable medium or a program storage device which is readable by a machine, such as the processor 12. The processor 12 may be, for example, a microprocessor, microcontroller, or a mainframe or workstation processor. The memory 16, which stores the ChannelMod software 18, may be, for example, a hard disk, ROM, CD-ROM, DRAM, or other RAM, flash memory, magnetic storage, optical storage, registers, or other volatile and/or non-volatile memory.

In FIGS. 1 and 2, the computer system 10 receives, as input data, a plurality of wireline logs which further include a plurality of rock classifications 20, to be described with greater detail below with reference to FIG. 4. When the processor 12 executes the ChannelMod software 18 stored in the memory 16 of the workstation 10, a plurality of 'grids' 22 are generated as output data (see FIG. 2), the 'grids' 22 of FIG. 2 representing a 'plurality of model realizations which further represent the architecture of a fluvial reservoir'. The concept of 'grids' will be discussed in greater detail below with reference to FIG. 5. A computer model representation of the grids 22 is ultimately displayed on a 3D Viewer 42.

In FIG. 2, the memory 16 of the computer system 10 is illustrated. The memory 16 stores the ChannelMod software 18 adapted for generating the 'grids representing the architecture of fluvial reservoirs' 22 (hereinafter called 'grids 22') in response to the rock classifications 20, the 'grids 22' of FIG. 2 further representing a 'plurality of model realizations which further represent the architecture of a fluvial reservoir'. The GeoFrame software 24 includes a CPS software 26, a Framework 3D software 29, a Property 3D software 28, and a Master Database 27. The grids 22 are provided to the 'Framework 3D' 29 and 'Property3D' 28 software in GeoFrame 24. The CPS software 26 is operatively connected to the ChannelMod software 18 via line 19 in FIG. 2. The output of the Property3D software 28 is operatively connected to a FloGrid software 30, and the output of the FloGrid software 30 is operatively connected to the 3D Viewer 42 via a simulator 40.

Seven separate blocks of software are illustrated in FIG. 2: (1) 'GeoFrame' 24, (2) 'CPS' 26, (3) 'Framework3D' 29, (4) 'Property3D' 28, (5) 'FloGrid' 30, (6) ChannelMod 18 and (7) the simulator 40. Each of these seven blocks of software are owned by Schlumberger Technology Corporation of Houston, Tex. The 'FloGrid' software 30 is disclosed and claimed in U.S. Pat. No. 6,106,561 to Farmer, the disclosure of which is incorporated by reference into the specification of this application.

In FIG. 2, the grids 22 of FIG. 2, generated as an output by the ChannelMod software 18 of the present invention in response to the rock classifications 20, are used by the 'Framework3D' 29 and 'Property3D' 28 portion of 'GeoFrame' 24 for subsequent use by the 'FloGrid' 30 software. The 'Framework 3D' 29 software is used to truncate grids 22 as a means of simulating channel erosion, while the 'Property 3D' 28 software is used to generate 3-D grids to embody the reservoir architecture represented by the grids 22 of FIG. 2. When the FloGrid software 30 receives the grids 22 from the GeoFrame software 24, a 'simulation grid output' is generated by the FloGrid software 30. A simulator 40 receives that 'simulation grid output', and, responsive thereto, the simulator 40 generates a plurality of 'simulation results' which are displayed on a 3D Viewer 42. These concepts are discussed in greater detail in U.S. Pat. No. 6,106,561 to Farmer and hereinbelow with reference to FIGS. 7 and 8 of the drawings.

Figure 3:
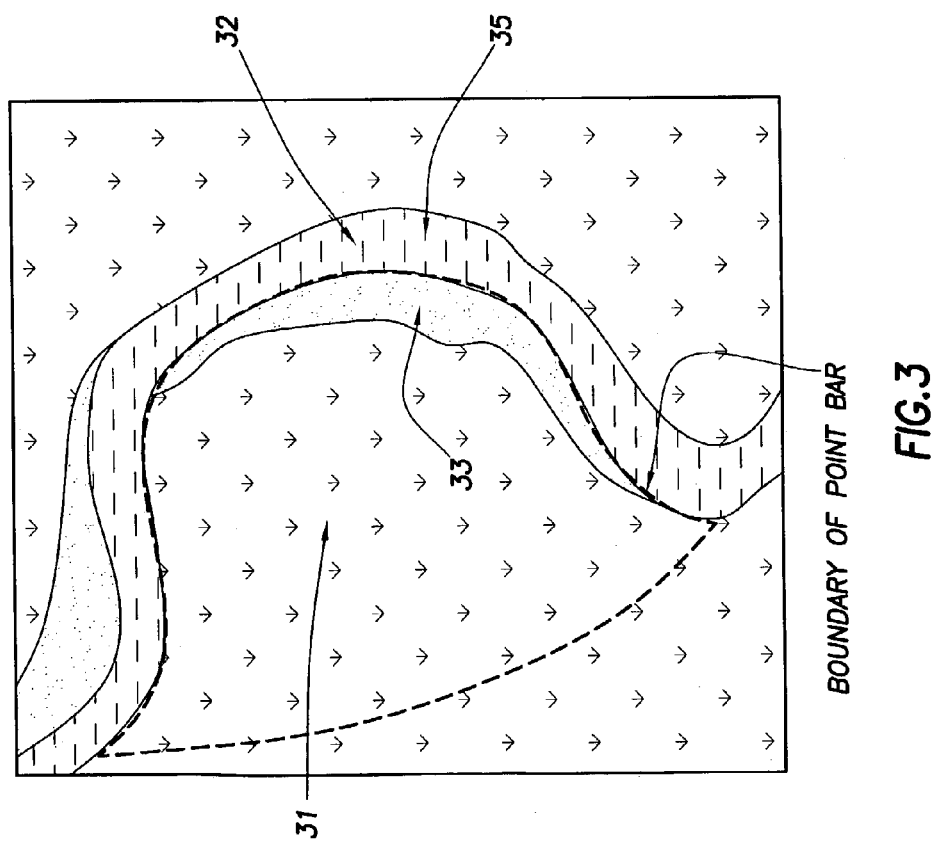
FIG. 3 illustrates by aerial photograph of a modern river the processes by which 'fluvial reservoirs' are formed.

Referring to FIG. 3, an aerial photo of a channel belt or fluvial reservoir is illustrated. Recall from FIG. 2 that a plurality of grids 22 representing the architecture of a 'fluvial reservoir' are generated by the ChannelMod software 18. FIG. 3 illustrates an example of an aerial photograph of a modern river. In FIG. 3, sands consisting mainly of sand are deposited in the point bar 31. Following channel abandonment, the channel 32 will become filled with mud 35. If the river channel of FIG. 3 subsequently forms a part of an oilfield reservoir, the channel mud fill 35 will represent a barrier to the subsequent flow of oil or gas from that oilfield reservoir.

Figure 4:
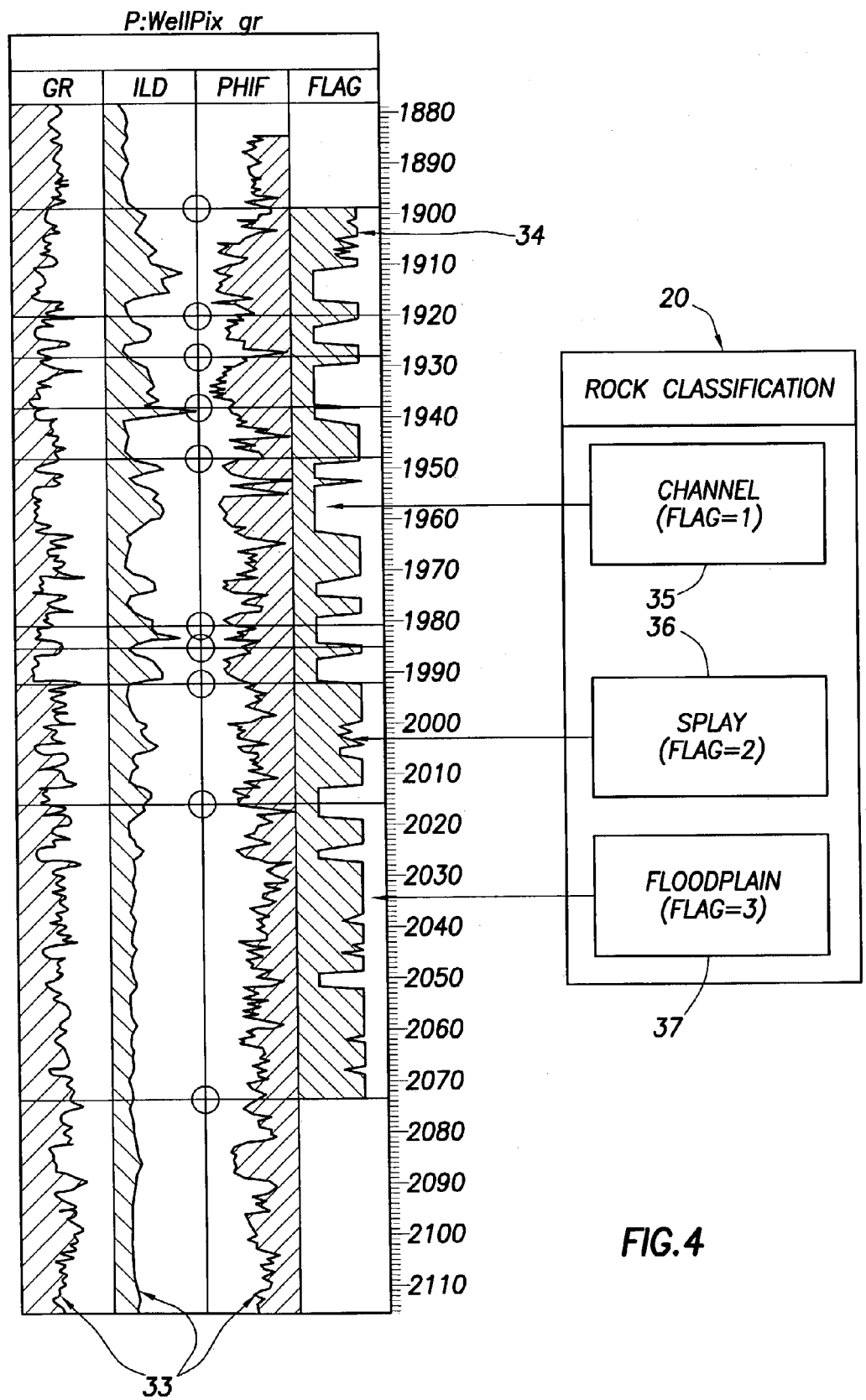
FIG. 4 illustrates an example of how the rock classification input data may be derived.

Referring to FIG. 4, a more detailed description of the rock classifications 20, being provided as input data to the workstation or computer system of FIG. 1, is illustrated. Wireline log responses 33 are interpreted in terms of the depositional environment in which the sediments causing the responses were laid down. A indicator log 34 is then constructed to represent the interpreted depositional environment; the different values assigned to this log 34 thus represent a rock classification scheme 20. In FIG. 4 three such facies or rock classifications 20 are shown: channel 35, splay 36 and floodplain 37. In this example, no channel fill shale is interpreted. The 'rock classification' 20 in FIG. 4 is provided as input data to the computer system 10 of FIG. 1 which stores the ChannelMod software 18 of the present invention in the memory 16. As an alternative approach, the rock classification generation software as described in prior pending U.S. patent application Ser. No. 10/338,380 filed Jan. 8, 2003, entitled "Rock Classification Method and Apparatus", which is now U.S. Pat. No. 6,751,557, may be used. The disclosure of the latter is incorporated by reference into the specification of this application.

Figure 5:
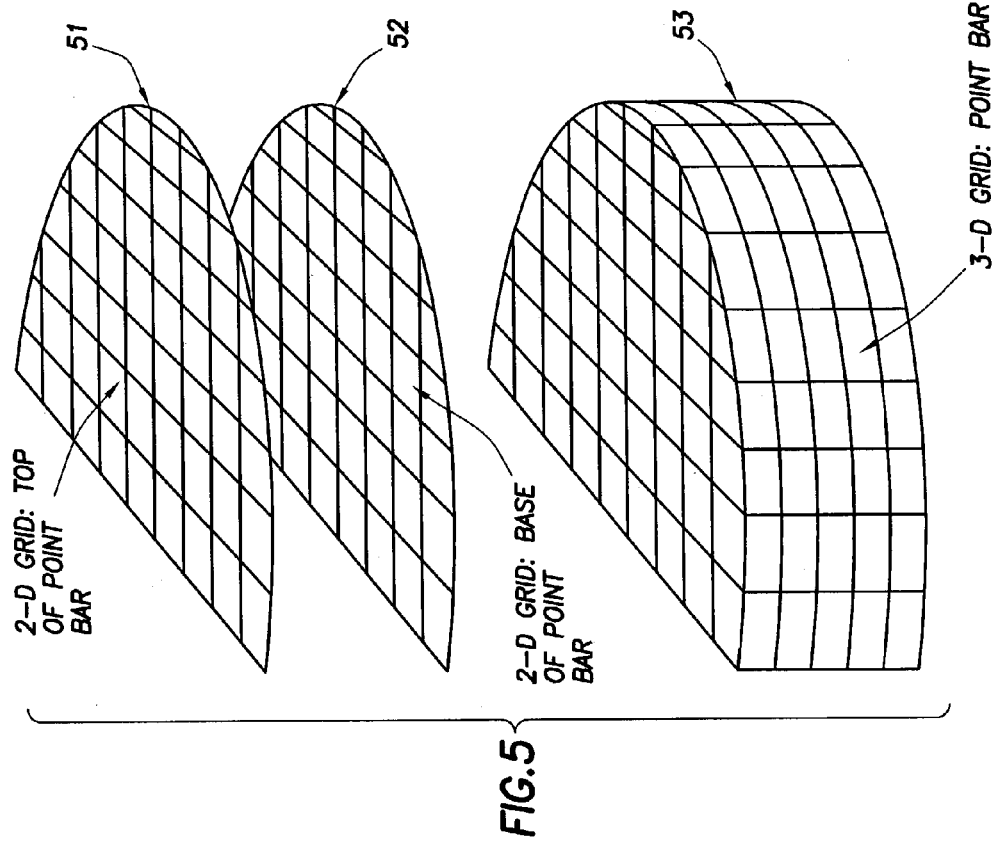
FIG. 5 illustrates the concept of two-dimensional (2-D) and three-dimensional (3-D) grids.

Referring to FIG. 5, a more detailed discussion of the 'grids' in block 22 of FIG. 2 (i.e., grids 22) is set forth in the following paragraph with reference to FIG. 5. In FIG. 5, 2-D grids represent the upper 51 and lower 52 bounding surfaces of a point bar. Such 2-D grids are generated by the ChannelMod software 18 (see 'grids representing architecture of fluvial reservoirs' 22 in FIG. 2). However, the FloGrid software 30 of FIG. 2 operates on grid representations of rock volumes rather than surfaces. Thus, the point bar of FIG. 5 must be represented as a 3D grid 53 of FIG. 5. This conversion is carried out by 'Property 3D' software 28 (FIG. 2).

Figure 6:
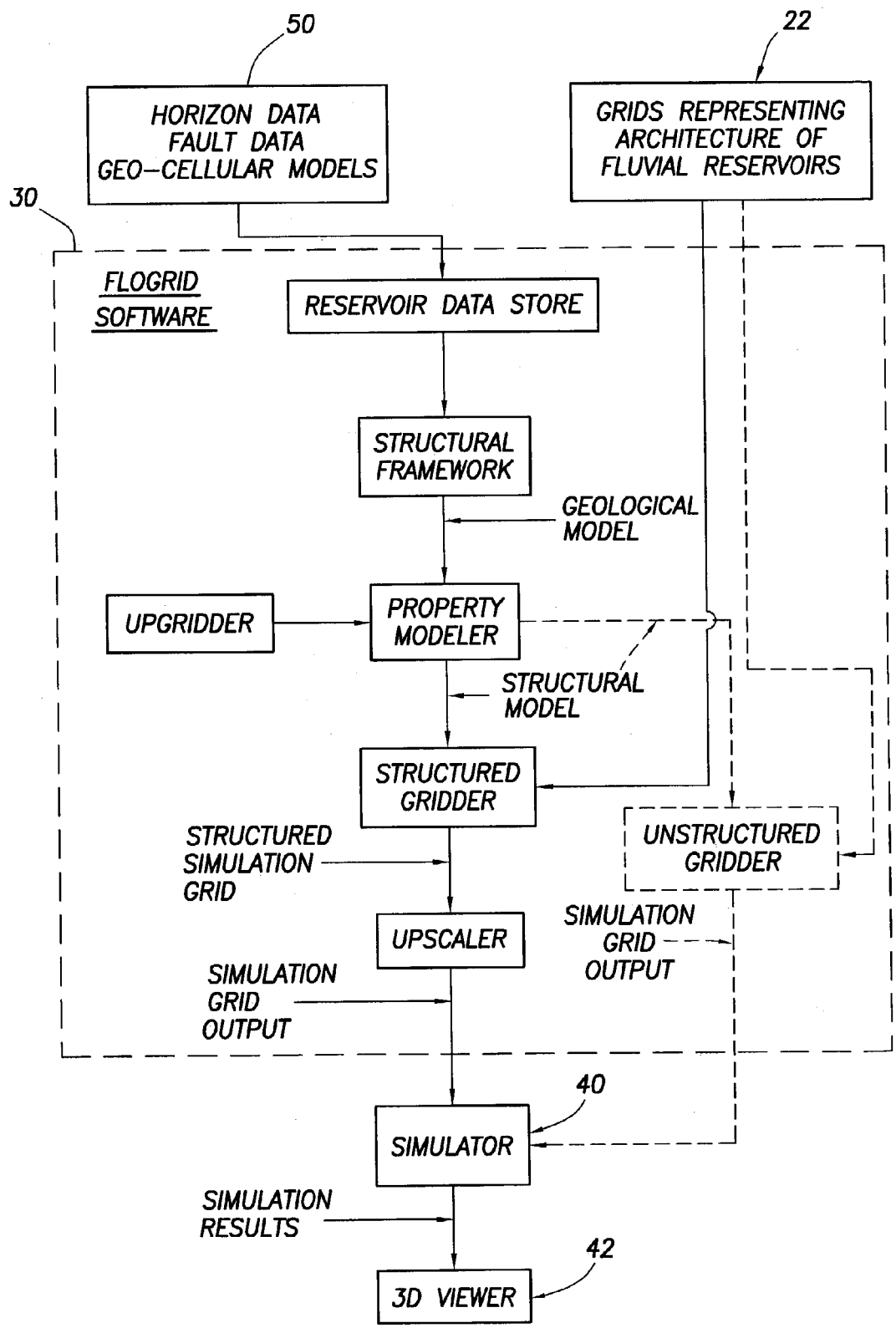
FIG. 6 illustrates a construction of the FlowGrid software of FIG. 2 including a simulator for generating simulation results and displaying the simulation results on the 3D Viewer.

Referring to FIG. 6, a more detailed construction of the FloGrid software 30 is illustrated. The FloGrid software 30 is operatively connected to the simulator 40, the simulator 40 being operatively connected to the 3D Viewer 42. In FIG. 5, the FloGrid software 30 receives 'horizon data, fault data, and geo-cellular models' 50; however, the FloGrid software 30 also receives the grids 22 of FIG. 2. The FlowGrid software 30 includes the following blocks: a reservoir data store which receives the 'horizon data, fault data, and geo-cellular models' 50, a structural framework, an upgridder, a property modeler, structured and unstructured gridders, either of which can receive the grids 22 of FIG. 2, and an upscaler. Each of these blocks of the FloGrid software 30 in FIG. 6 are described in detail in U.S. Pat. No. 6,106,561 to Farmer, the disclosure of which has already been incorporated by reference into the specification of this application. In FIG. 6, the upscaler of the FloGrid software 30 will generate a 'simulation grid output' and the 'unstructured gridder' of the FloGrid software 30 will also generate a 'simulation grid output'. In response to both 'simulation grid outputs', the simulator 40 will generate a plurality of 'simulation results' which will be displayed on the 3D Viewer 42.

Figure 7:
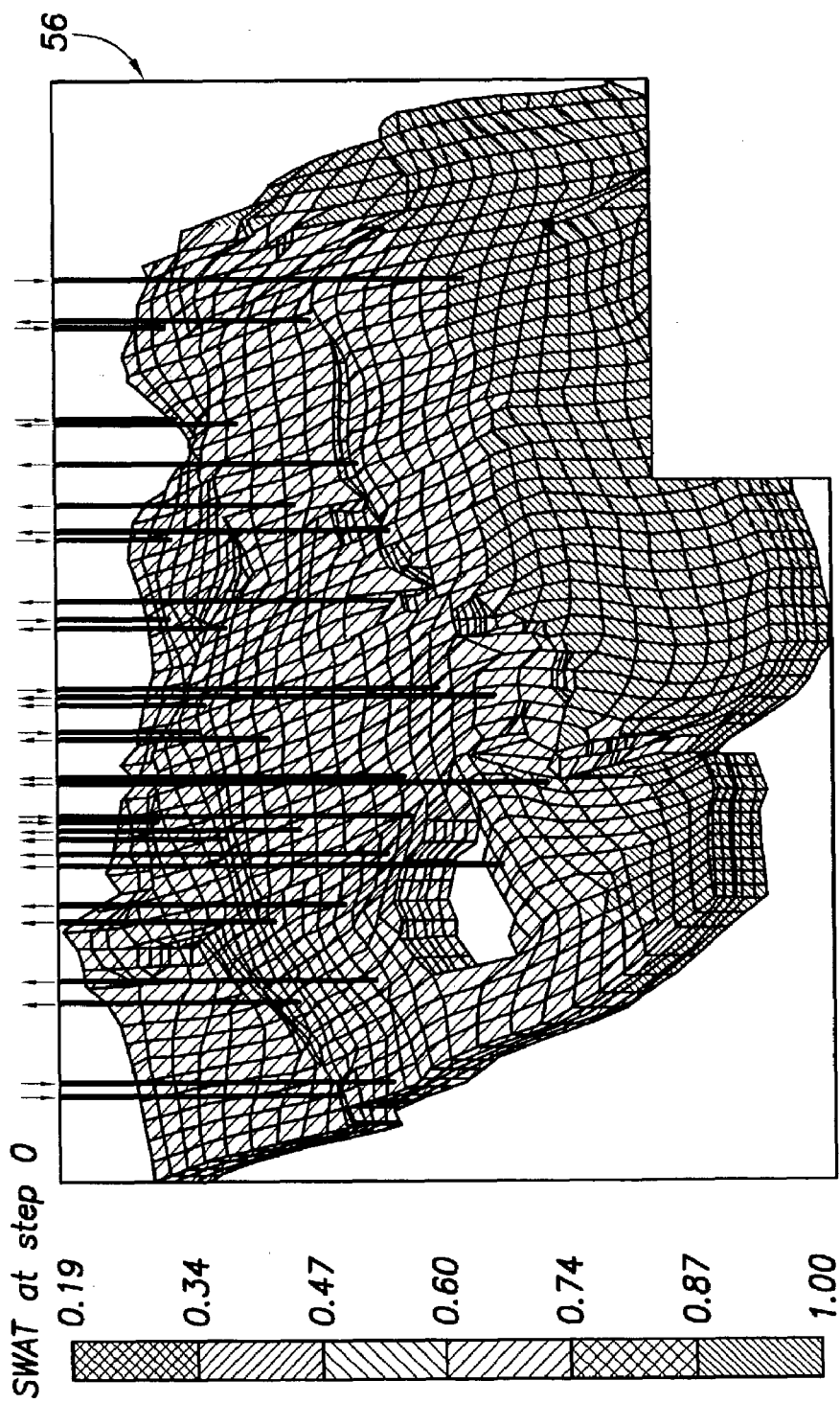
FIG. 7 illustrates an example of a set of simulation results that are generated by the simulator and displayed on the 3D Viewer of FIG. 6.

Referring to FIG. 7, an example of the 'simulation results' generated by the simulator 40 and displayed on the 3D Viewer 42 of FIG. 6 is illustrated.

Figure 8:
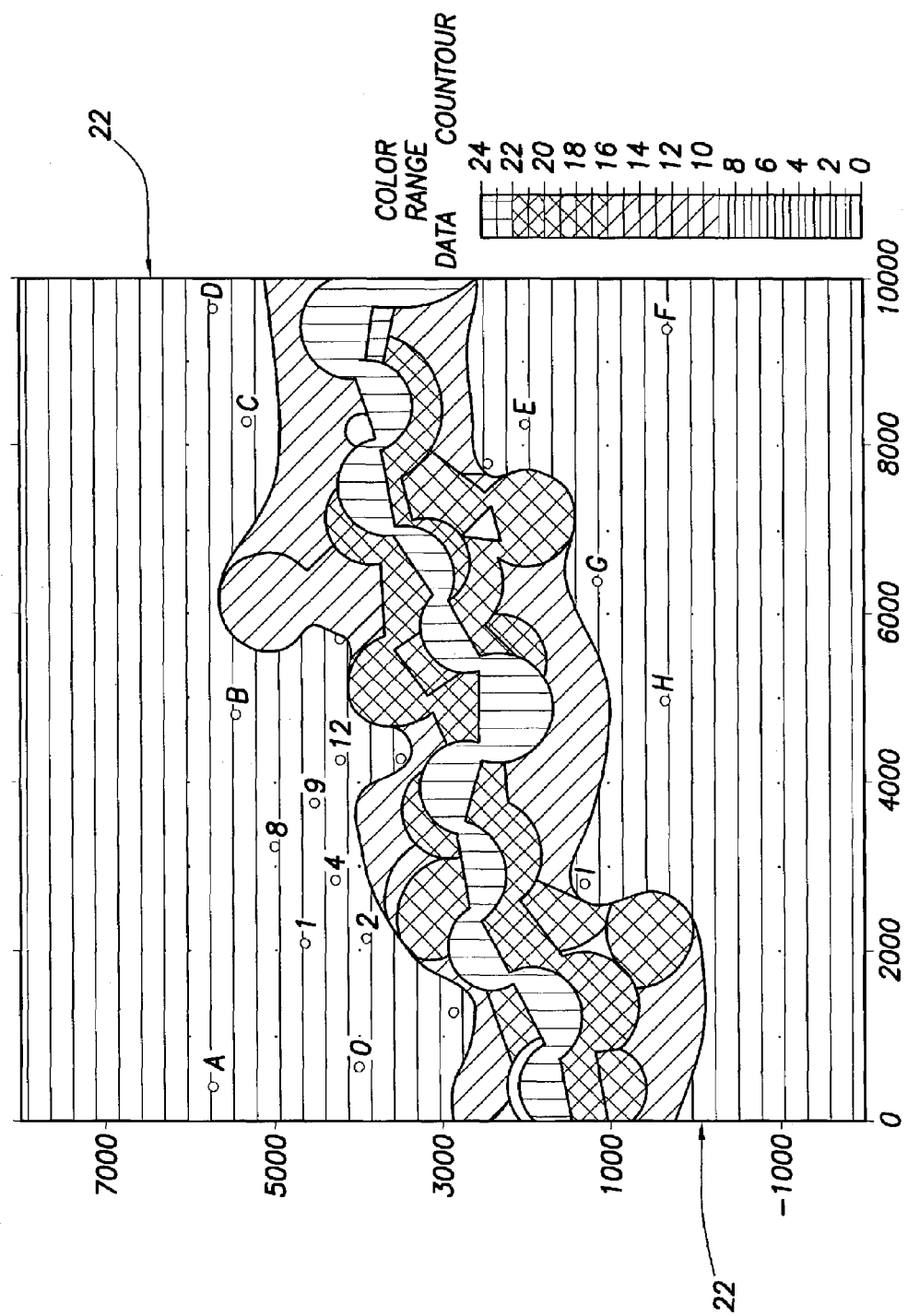
FIG. 8 illustrates an example of the 'grids representing the architecture of fluvial reservoirs' 22 of FIG. 2 representing the base of a channel belt which are generated as an output by the ChannelMod software of FIG. 2 when the ChannelMod software of the present invention is executed by the workstation processor, the 'grids' 22 being provided as input data to the FloGrid software 30 via GeoFrame of FIG. 2.

Referring to FIG. 8, recall from FIGS. 1 and 2 that the ChannelMod software 18 will generate the 'grids' 22, representing the 'architecture of fluvial reservoirs' when the processor 12 executes the ChannelMod software 18 stored in the memory 16 in response to the rock classifications 20. FIG. 8 illustrates an example of the 'grids' 22 of FIG. 2 which represents a 'plurality of model realizations representing an architecture of a fluvial reservoir' generated by the ChannelMod software 18 of FIG. 2. FIG. 8 comprises a plurality of grid cells. Each grid cell will be assigned a color depending on the numerical property assigned to that grid cell. As a result, FIG. 8, which represents depth to the base of a channel belt, includes a plurality of colors corresponding, respectively, to the plurality of grid cells which comprise the channel belt of FIG. 8.

Figure 9:
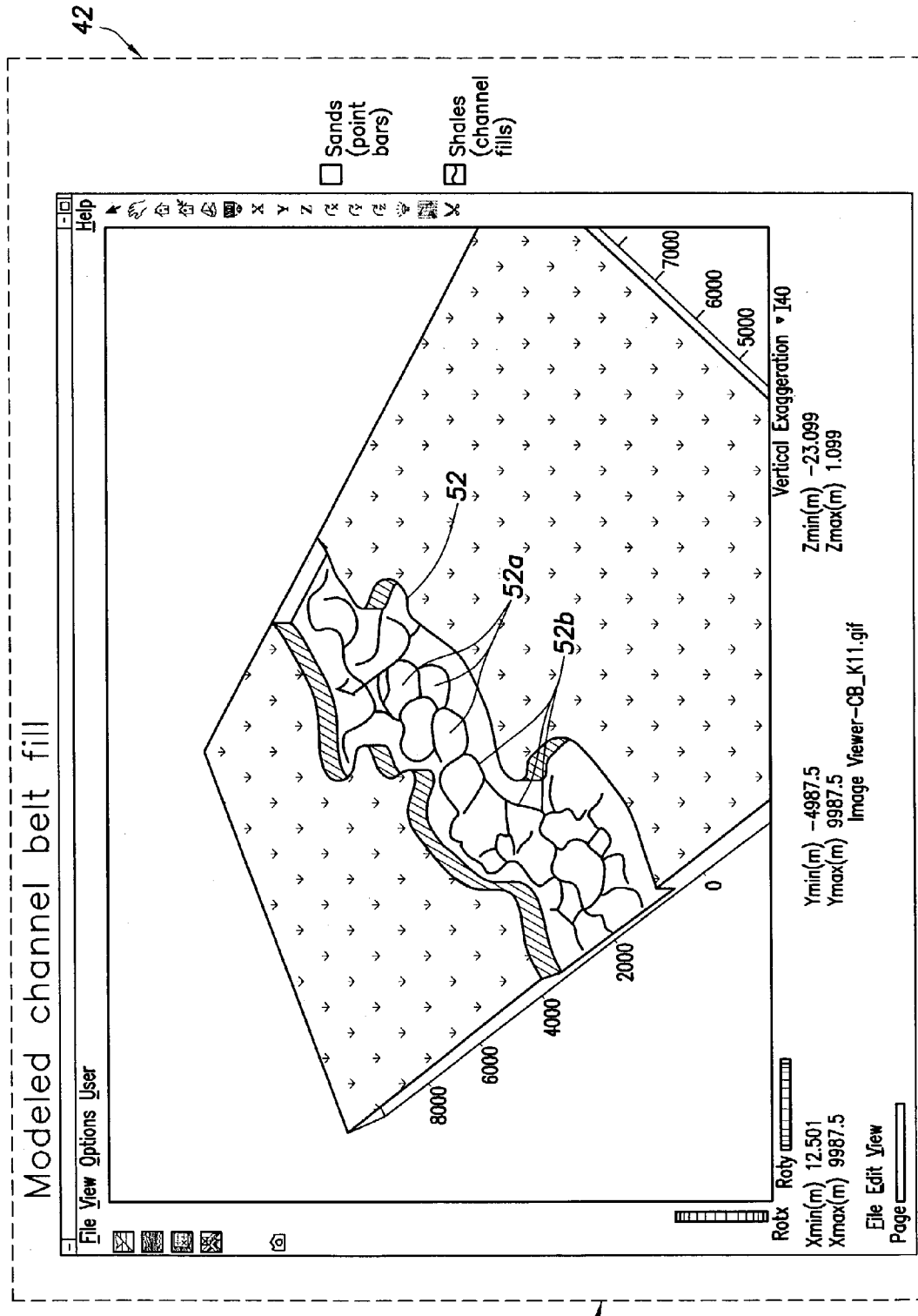
FIG. 9 illustrates an example of a three dimensional computer representation of the channel belt of FIG. 8 that is displayed on the 3D Viewer 42 of FIG. 2 and which corresponds to the 'grids representing the architecture of fluvial reservoirs' 22 of FIG. 2 generated by the workstation computer system of FIG. 1.

Referring to FIG. 9, when the ChannelMod software 18 is executed by the processor 12 of the computer system 10 of FIG. 1, a 'final output display' is displayed on the 3D Viewer 42, and that 'final output display' is illustrated in FIG. 9. FIG. 9 illustrates a three dimensional 'computer model representation' of the channel belt aerial photo of FIG. 3, FIG. 9 representing a plurality of grids, the plurality of grids being adapted for display on a display device, such as the 3D Viewer 42. FIG. 9 appears on the 3D Viewer 42 and it corresponds to the 'grids' 22 in FIGS. 2 and 8 that are generated by the ChannelMod software 18 representing the 'architecture of fluvial reservoirs'. In FIG. 9, an illustration 42 which is displayed on the 3D Viewer 42 of FIG. 2 includes a channel belt 52. The channel belt 52 includes a first element 52a representing sand through which oil or gas can flow and a second element 52b representing shale, through which oil or gas cannot flow. The impervious rock of the second element 52b represents a barrier because oil or gas cannot flow through the barrier. As a result, the oil or gas cannot flow directly from a first element 52a, through a second element 52b, and back into another first element 52a because the impervious rock of the second element 52b represents a barrier through which oil or gas cannot flow. As a result, the illustration 42 of FIG. 9 is a 'computer model representation' of the internal architecture of a fluvial reservoir. Consequently, the illustration 42 in FIG. 9 is a visualization of the ultimate grid output generated in response to the execution of the ChannelMod software 18 by the processor 12 of computer system 10. The illustration 42 of FIG. 9 is displayed on the 3D Viewer 42.

Figure 10:
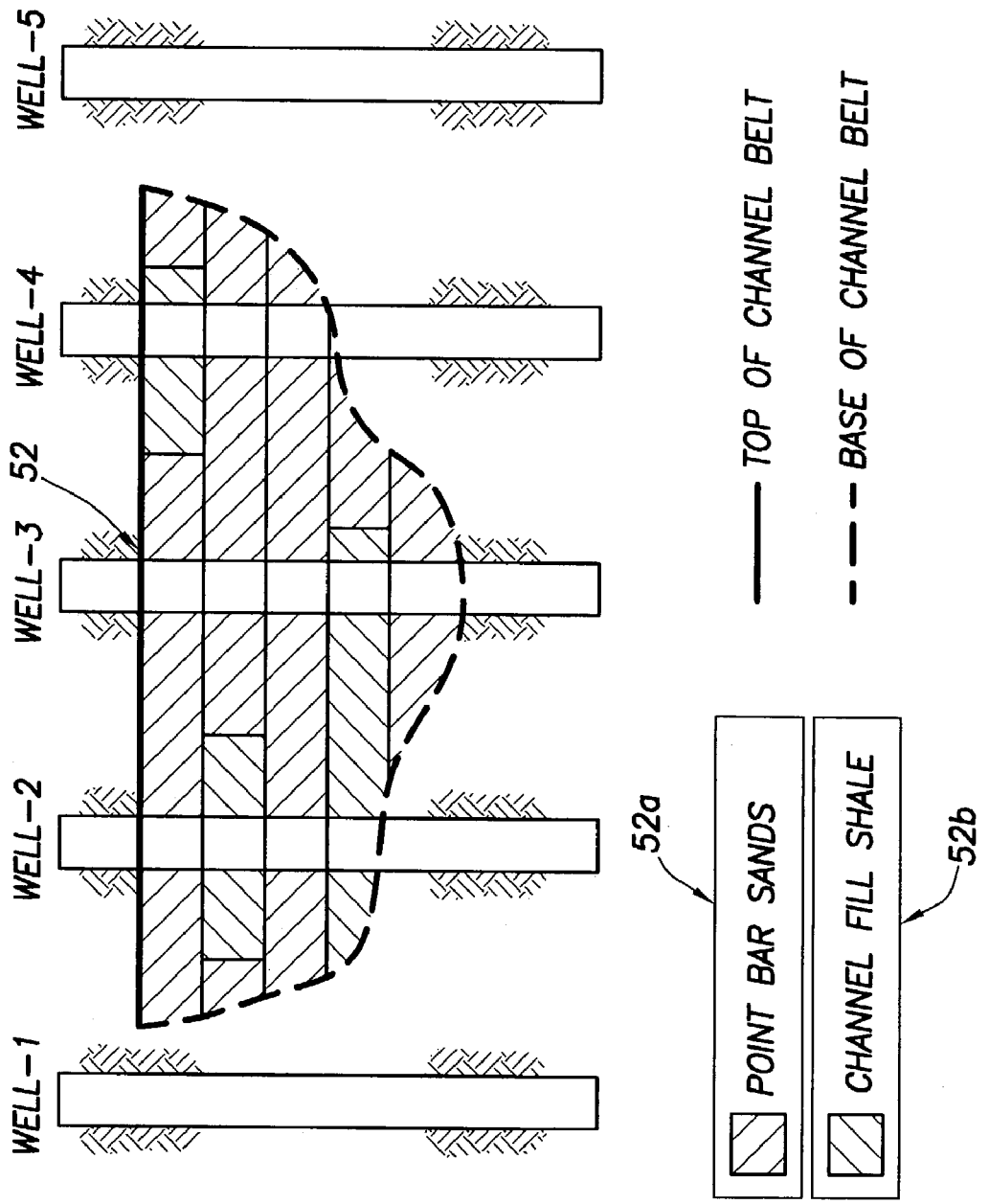
FIG. 10 illustrates a schematic cross section of the channel belt of FIG. 9.

Referring to FIG. 10, a cross section of the channel belt 52 of FIG. 9 is illustrated. In FIG. 10, several layers of the reservoir or channel belt 52 of FIG. 9 are illustrated in cross section. Note a plurality of the first elements 52a in a plurality of layers of the channel belt 52 which represent the sand through which the oil and/or gas can flow and further note a plurality of the second elements 52b in another plurality of layers of the channel belt 52 which represents the shale or other impervious rock through which the oil and/or gas cannot flow.

Figure 11:
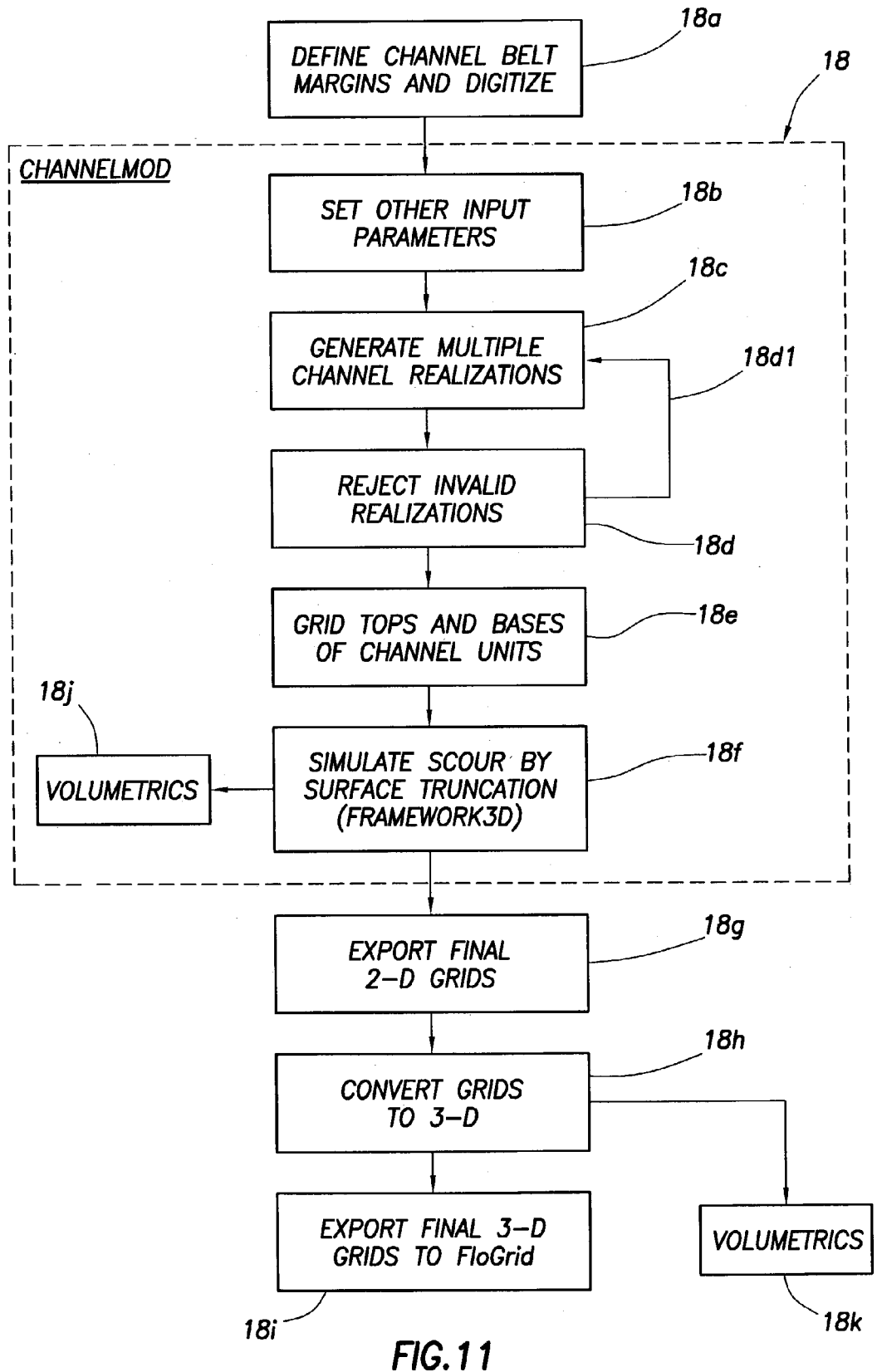
FIG. 11 illustrates a more detailed construction representing a workflow of the ChannelMod software stored in the memory of the computer system shown in FIG. 1.

Referring to FIGS. 11 through 23, a workflow, for which the ChannelMod software 18 stored in the memory 16 of the computer system 10 of FIG. 1 is designed, is illustrated in FIG. 11. In FIG. 11, that workflow includes the following steps: (1) Define channel belt margins and digitize 18a, (2) Set other input parameters 18b, (3) Generate multiple channel realizations 18c, (4) Reject invalid realizations 18d, (5) Grid tops and bases of channel units 18e, (6) Simulate scour by surface truncation 18f, (7) Export 'final 2D grids' 18g, where the 'final 2D grids' represent the grids 22 of FIG. 2, the grids 22 further representing the 'plurality of model realizations representing the architecture of a fluvial reservoir', (8) Convert grids to 3D 18h, (9) Export final 3D grids to FloGrid 18i, and (10) Volumetrics 18j and 18k. Each of these steps will be discussed in detail below. Steps 18b to 18f inclusive, and 18j, are performed by the ChannelMod software 18 of FIG. 2.

Define Channel Belt Margins and Digitize, step 18a of FIG. 11

In FIG. 2, it is necessary to set up a framework in GeoFrame 24, since the Master Database 27 resides in GeoFrame 24. Using the data residing in GeoFrame 24, and, in particular, the rock classifications 20 of FIGS. 1 and 2, we can define the 'limits of the channel belt', such as the channel belt 52 in FIG. 9 (see also FIG. 31). In FIG. 2, those 'limits', as defined in GeoFrame 24, are then provided by the GeoFrame software 24 to the ChannelMod software 18 via line 17 in FIG. 2.

Set Other Input Parameters, step 18b of FIG. 11

Figure 12:
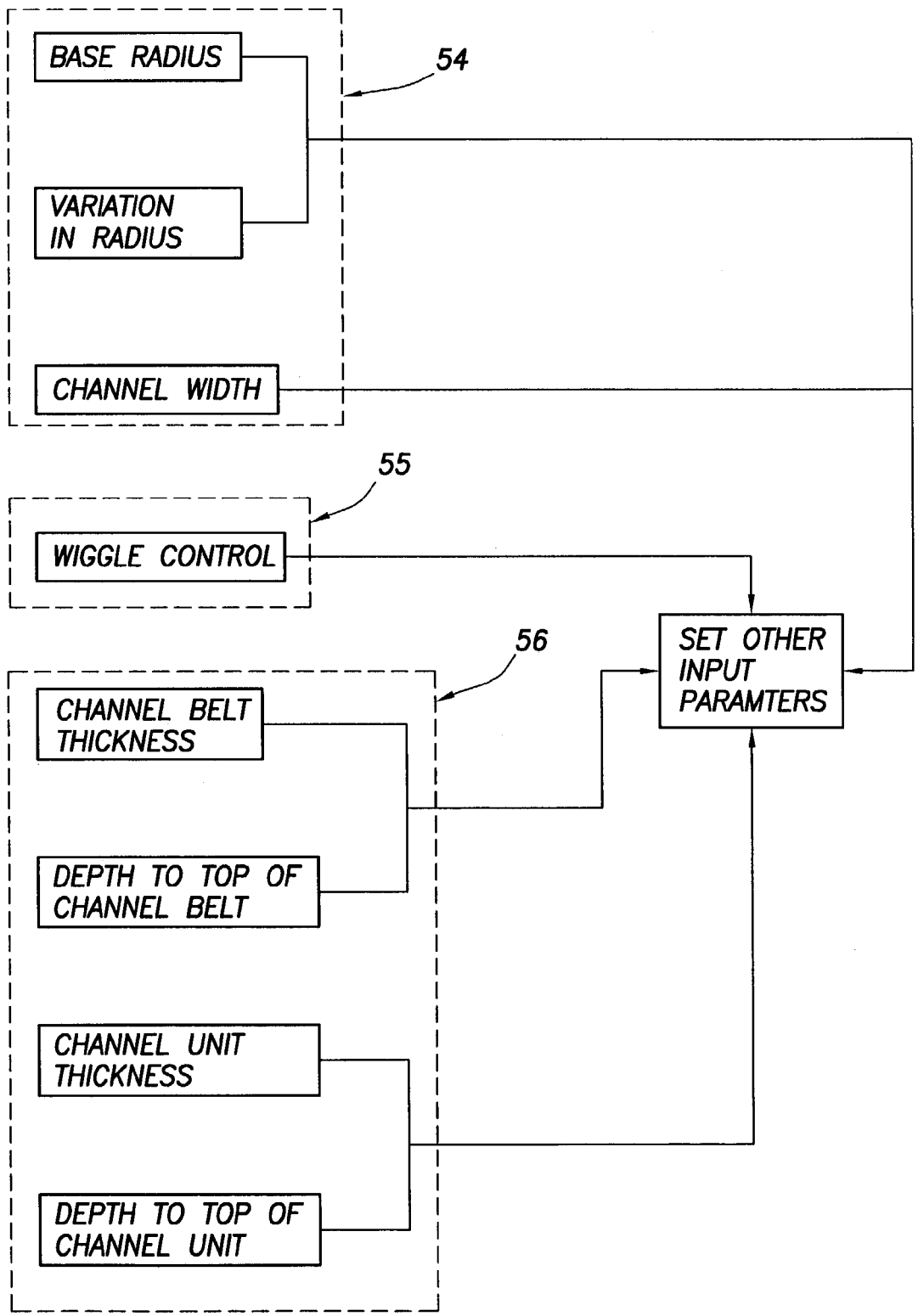
FIG. 12 illustrates the input parameters that can be controlled in the ChannelMod software.
Figure 13:
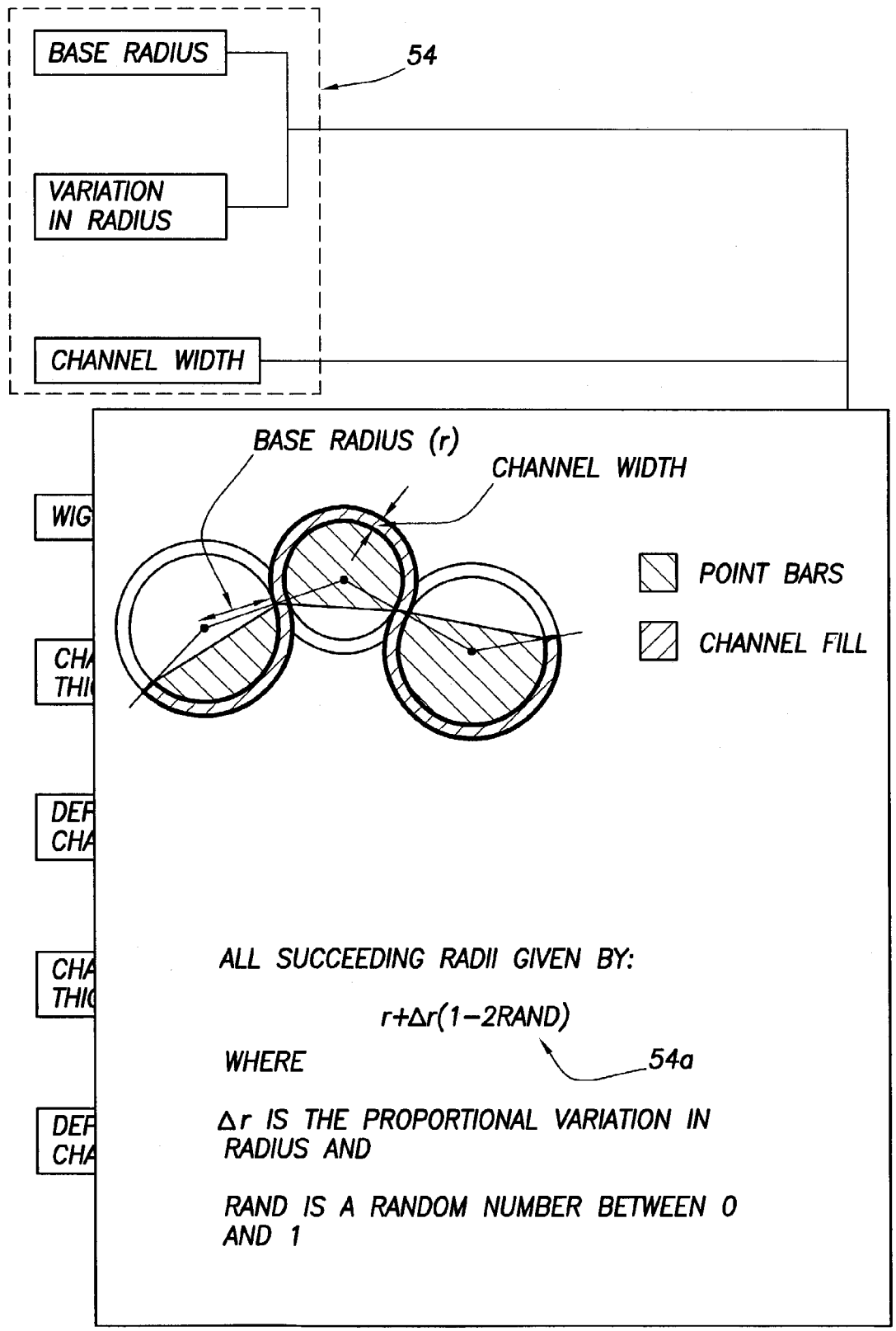
FIG. 13 illustrates the definition of base channel radius and channel width and the manner in which channel radius varies between successive meander loops.
Figure 14:
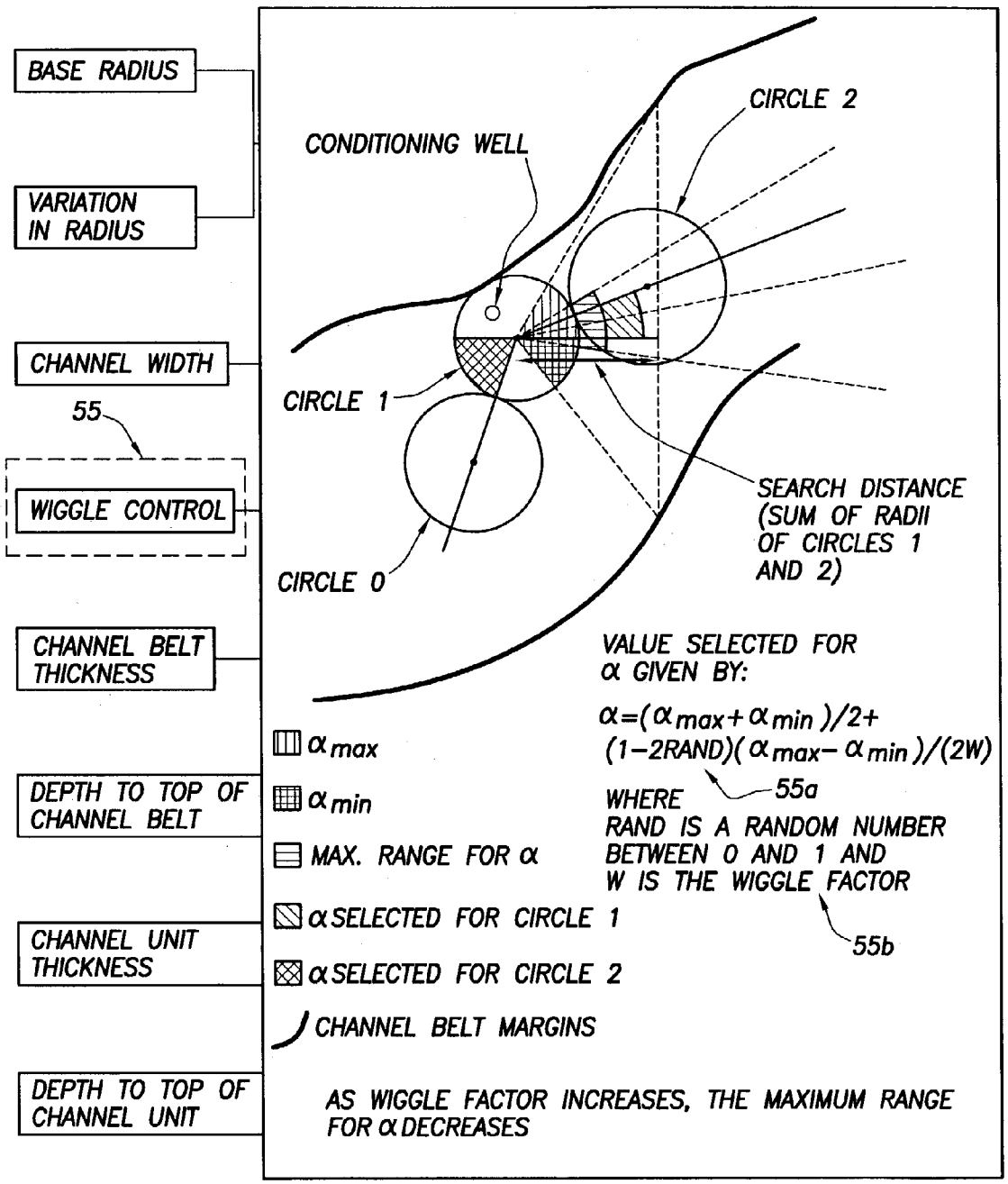
FIG. 14 illustrates the control exerted on channel direction by the Wiggle Factor.
Figure 15:
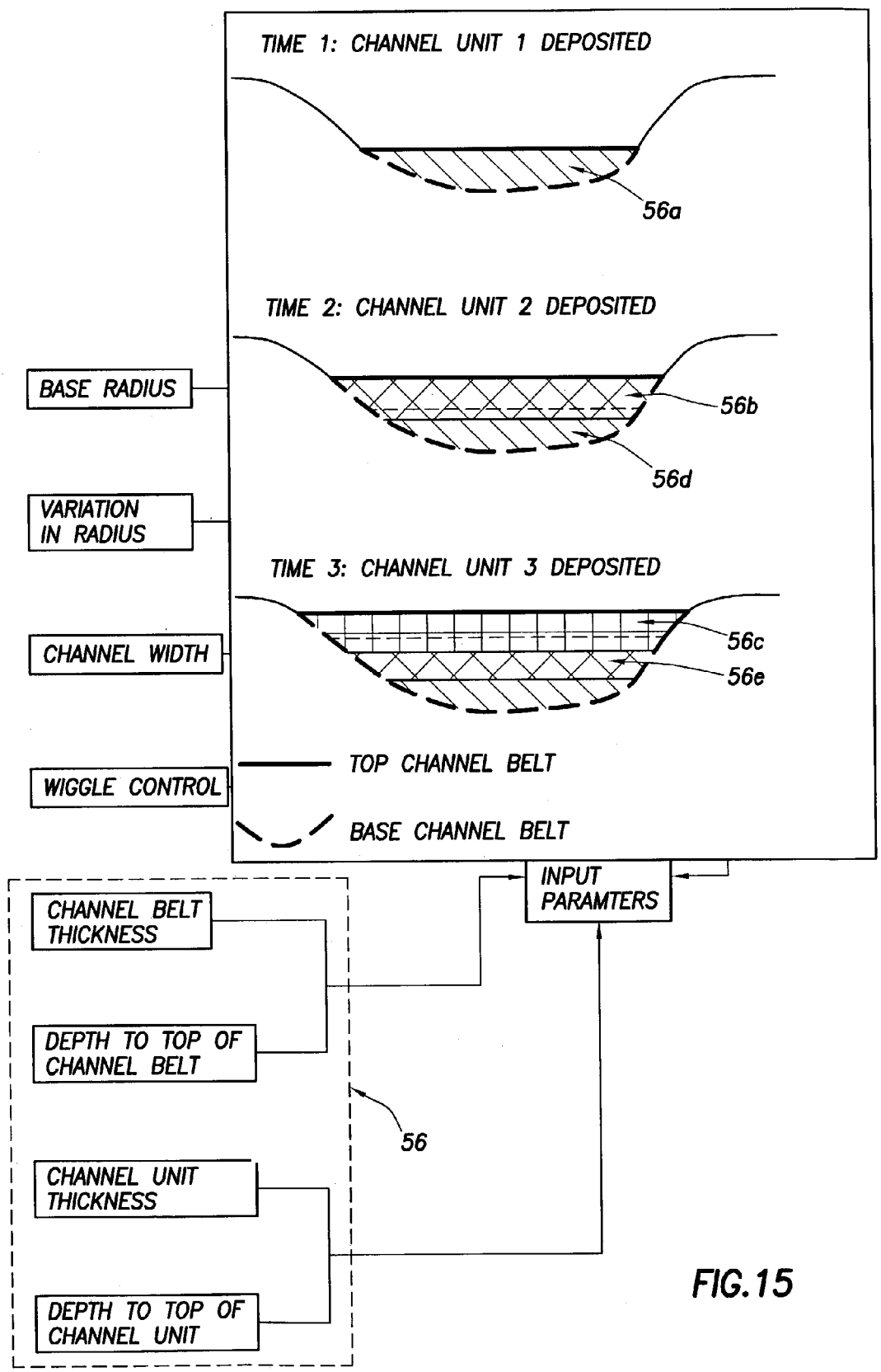
FIG. 15 illustrates the process whereby successive channel units stack to form a channel belt.

In FIGS. 11, 12, 13, 14, and 15, the output from Channel Mod software 18 in FIG. 2 depends not only on the 'rock classifications' input data 20 of FIG. 2 and the 'limits of the channel belt' from step 18a but also on the settings assigned to a number of input parameters. The parameters that can be altered by the user are shown in FIG. 12. Those parameters may be classified into three groups 54, 55 and 56 in FIG. 12. First are the parameters that control the size and shape of the individual meander loops as shown in 54 of FIG. 13. The software incorporates a random number generator 54a in FIG. 13 to allow generation of a plurality of loop sizes. Second are the parameters that influence extent to which the course of the modeled channel varies, or "wiggles", as shown in 55 of FIG. 14. Another random number generator 55a in FIG. 14 is incorporated to allow generation of a plurality of channel courses within the constraint provided by the wiggle factor 55b in FIG. 14. Third are the parameters that control the vertical thickness of the channel belt and its component channel units, as illustrated in 56 of FIG. 15. Note that the thickness of each channel unit 56a, 56b and 56c in FIG. 15 represents its original deposited thickness, such that the sum of thicknesses of individual channel units can exceed the thickness of the channel belt, as is the case in 56 of FIG. 15. In such cases, part of all or some of the units is removed by simulated erosion to ensure that the sum of the final thicknesses of the channel units 56c, 56d and 56e in FIG. 15 is equal to the thickness of the channel belt.

Generate Multiple Channel Realizations, step 18c of FIG. 11

Figure 16A:
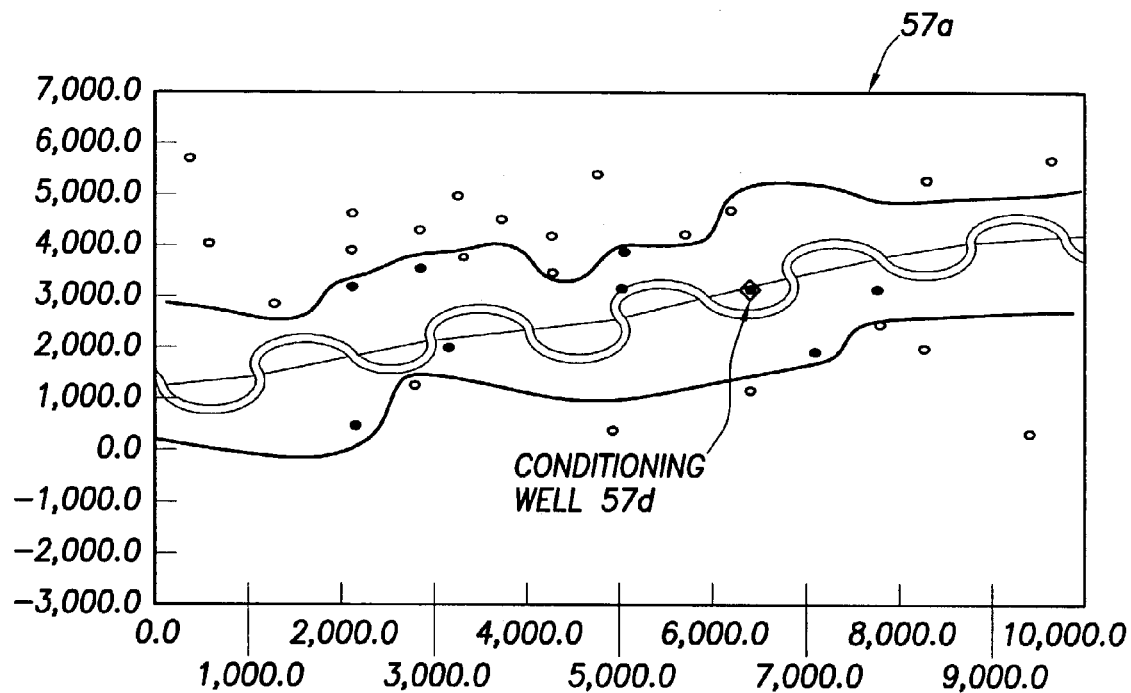
FIGS. 16A, 16B, and 16C illustrates three model realizations generated by the ChannelMod software.
Figure 16B:
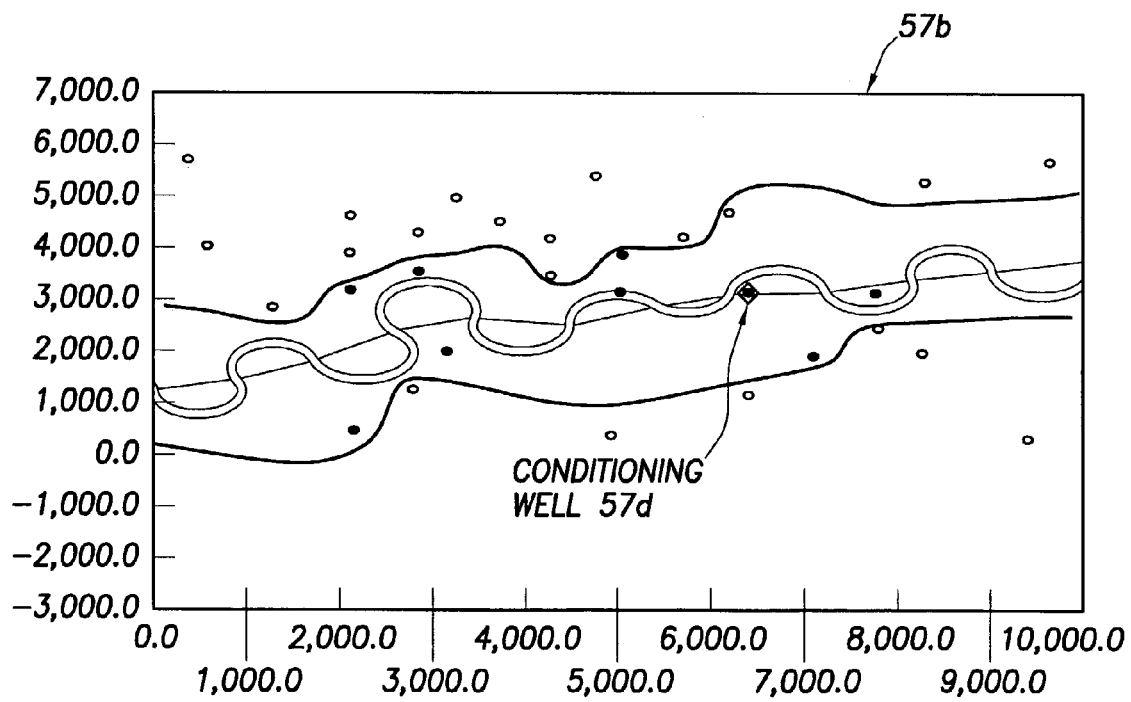
Figure 16C:
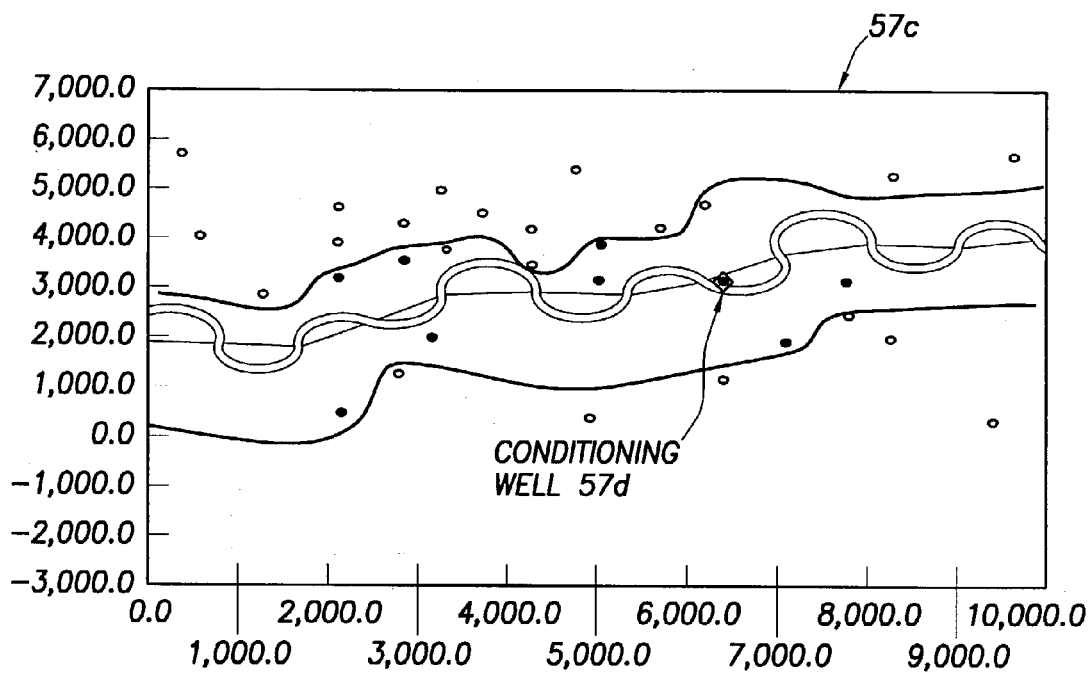
Figure 19A:
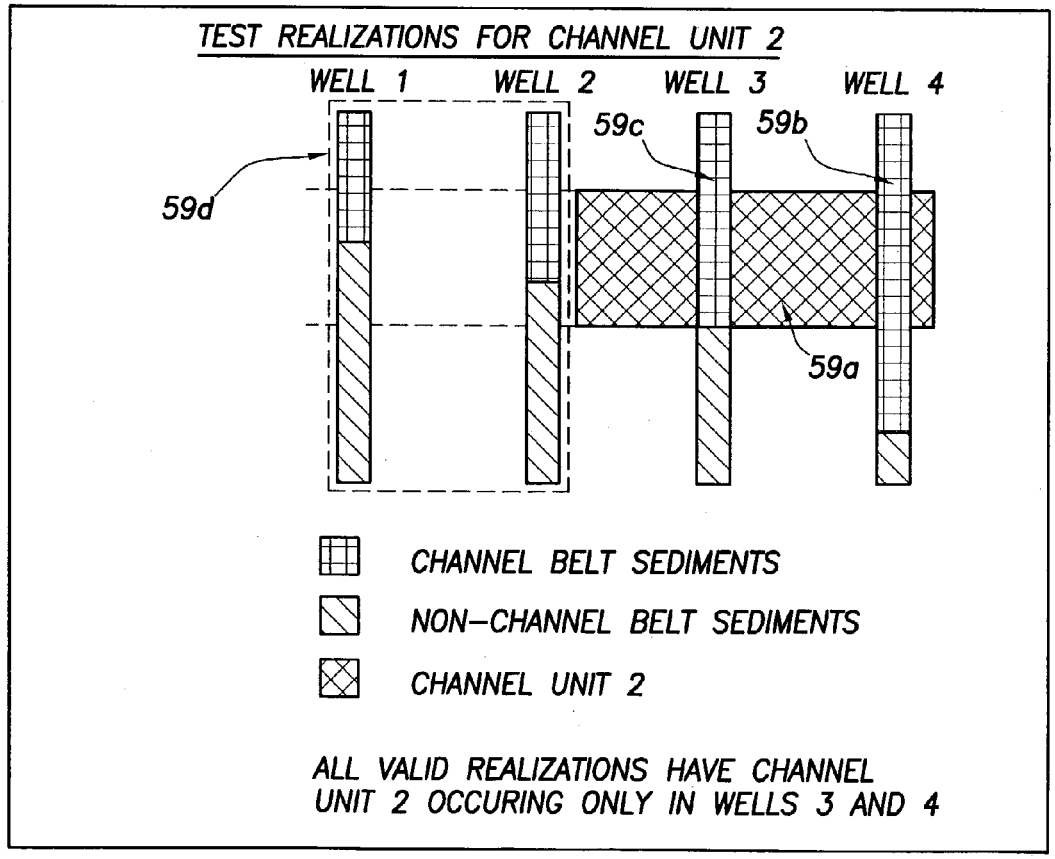
Figure 17:
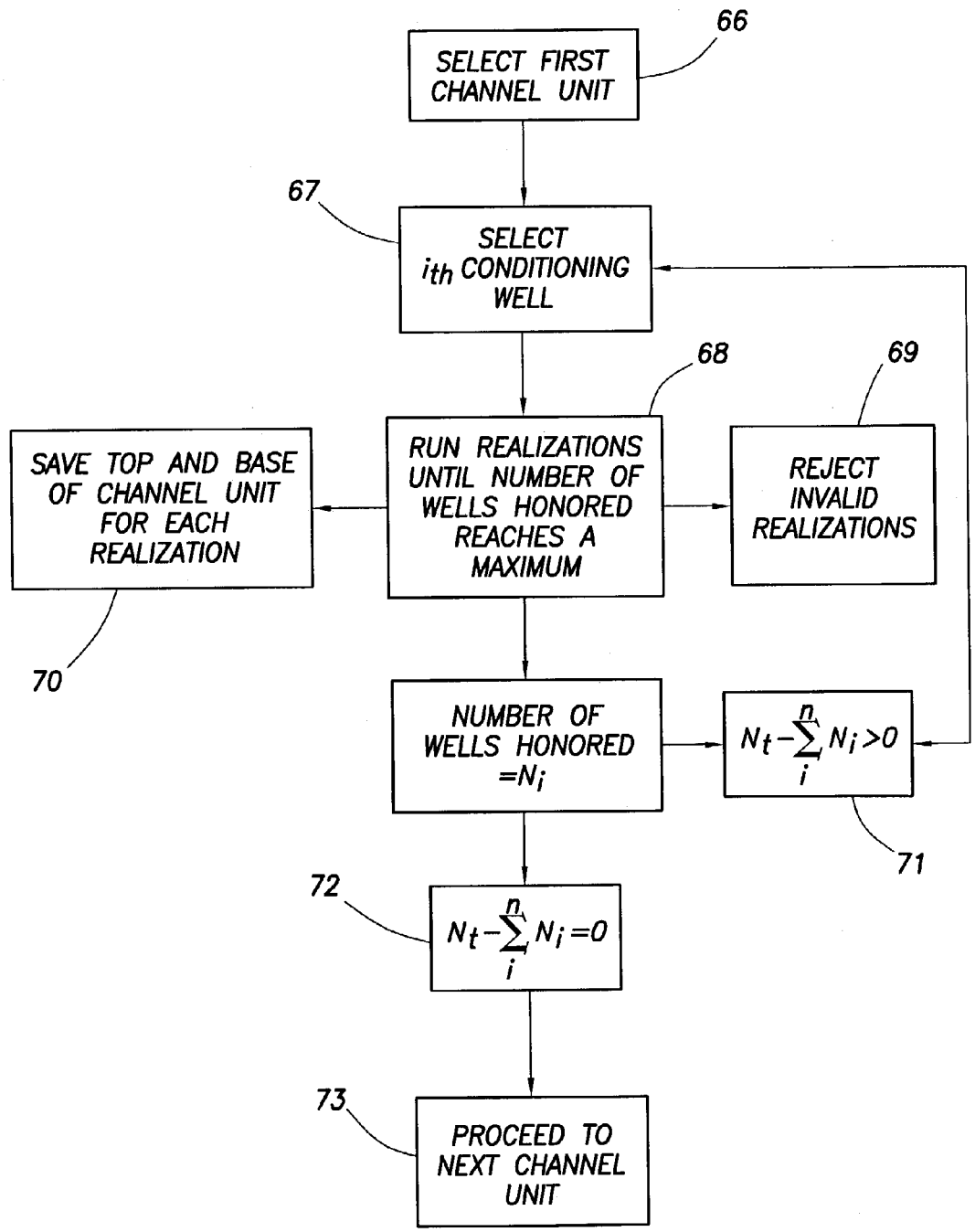
FIG. 17 illustrates the process applied to ensure that all input data are honored in the minimum number of realizations.
Figure 18A:
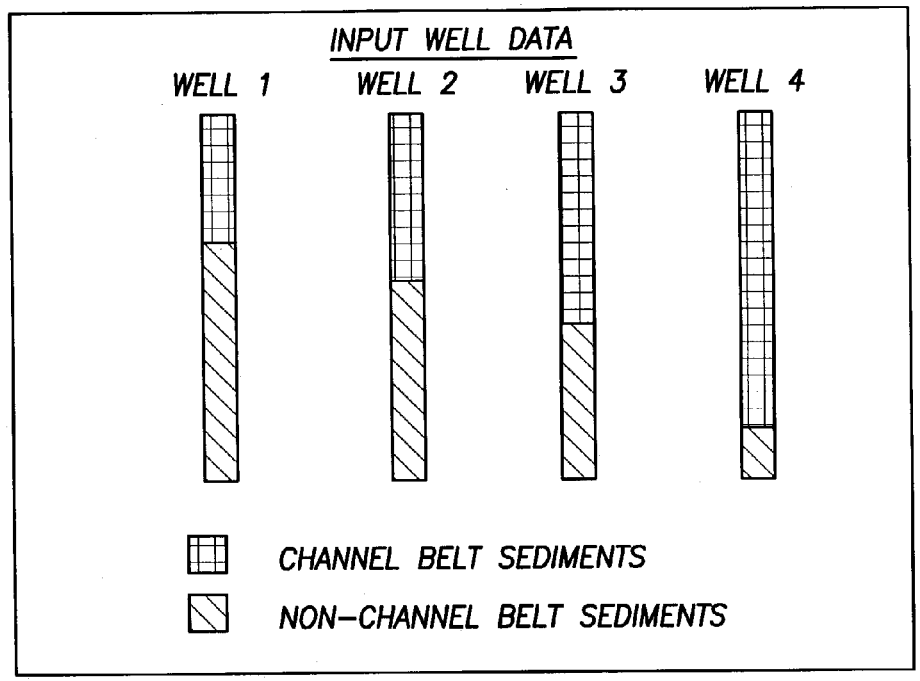
FIG. 18, which includes FIGS. 18A and 18B, and FIG. 19, which includes
Figure 18B:
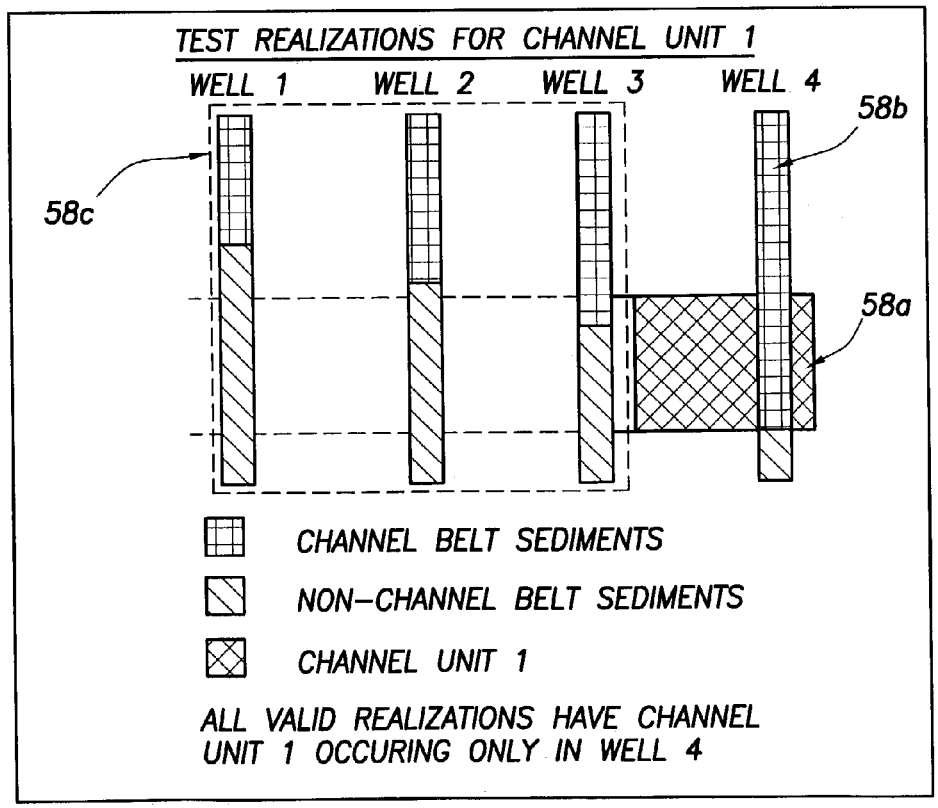

In FIGS. 11, 16A, 16B, 16C, and 17, when the 'limits of the channel belt' are provided to the ChannelMod software 18 from step 18a, the ChannelMod software 18 will then generate a plurality of channels (first one channel then another channel). As a result, when the ChannelMod software 18 generates the plurality of channels, a 'plurality of statistical realizations' 57a, 57b and 57c in FIGS. 16A, 16B, and 16C, are created corresponding, respectively, to the plurality of channels. FIGS. 16A-16C depict one of the well data points as being a "conditioning well" 57d. This well is selected on the 'Input Parameters' worksheet of ChannelMod software 18; the program then ensures that all realizations are 'conditioned' by, or honor, that data point. Thus the 'conditioned well' 57d is known from 'Rock Classifications' 20 to contain a point bar in the channel unit being modeled for FIGS. 16A through 16C. However it will not necessarily be possible to honor all the other wells using one specific well for conditioning. In such cases, other wells need to be selected for conditioning. The logical process for doing this is shown in FIG. 17. Channel units are modeled one at a time. After selecting the first channel unit 66, one well 67 is selected as the conditioning well. Multiple realizations 68 are then run; invalid realizations are rejected 69 and grids are saved for each valid realization 70. This continues until no improvement in the degree of fit to the input data is possible. At that point, a different well is selected for conditioning 71 unless all the wells in the channel unit have been honored in at least one realization 72. The process is then repeated using a series of new conditioning wells until all the wells have been honored. Once that has happened, the process is repeated for the next channel unit 73.

Reject Invalid Realizations step 18d of FIG. 11

In FIGS. 11, 18A-18B, and 19A-19B, the following paragraph describes the process whereby invalid realizations are rejected, as shown in step 69 of FIG. 17. If a particular statistical realization indicates that there is a sand body in a particular well and it is known that shale (and not sand) exists in that particular well, that particular statistical realization must be rejected. Thus, for example, Channel unit 1 58a in FIGS. 18A and 18B can occur in Well 4 58b but not Wells 1, 2 and 3 58c. Similarly, Channel unit 2 59a in FIGS. 19A and 19B can occur in Wells 3 59c and 4 59b but not in Wells 1 and 2 59d. The 'plurality of statistical realizations' is continuously tested in this manner via a do-loop 18d1 in FIG. 11. The do-loop 18d1 in FIG. 11 ensures that the multiple channel realizations of step 18c are continuously generated and that the generated multiple channel realizations are continuously tested in the 'reject invalid realizations' step 18d of FIG. 1. Testing is carried out using the spreadsheet 60 in FIGS. 19A and 19B. As a result, a plurality of 'valid channel realizations' are generated by the ChannelMod software 18 of FIG. 11.

Grid Tops and Bases of Channel Units, step 18e of FIG. 11

In FIGS. 11, 17, 20A-20B, and 21A-21B, for every valid realization generated by ChannelMod software 18, grids representing the tops and bases of the modeled channel units are saved as indicated at 70 in FIG. 17. Examples of the resulting 2-D grids are shown in FIGS. 20A-20B and 21A-21B. The numbers in red correspond to the value of the grid at the grid nodes represented by black crosses. Note that the grids are indeterminate outside the area occupied by the channel unit being modeled.

Simulate Scour by Surface Truncation, step 18f of FIG. 11

Figure 22:
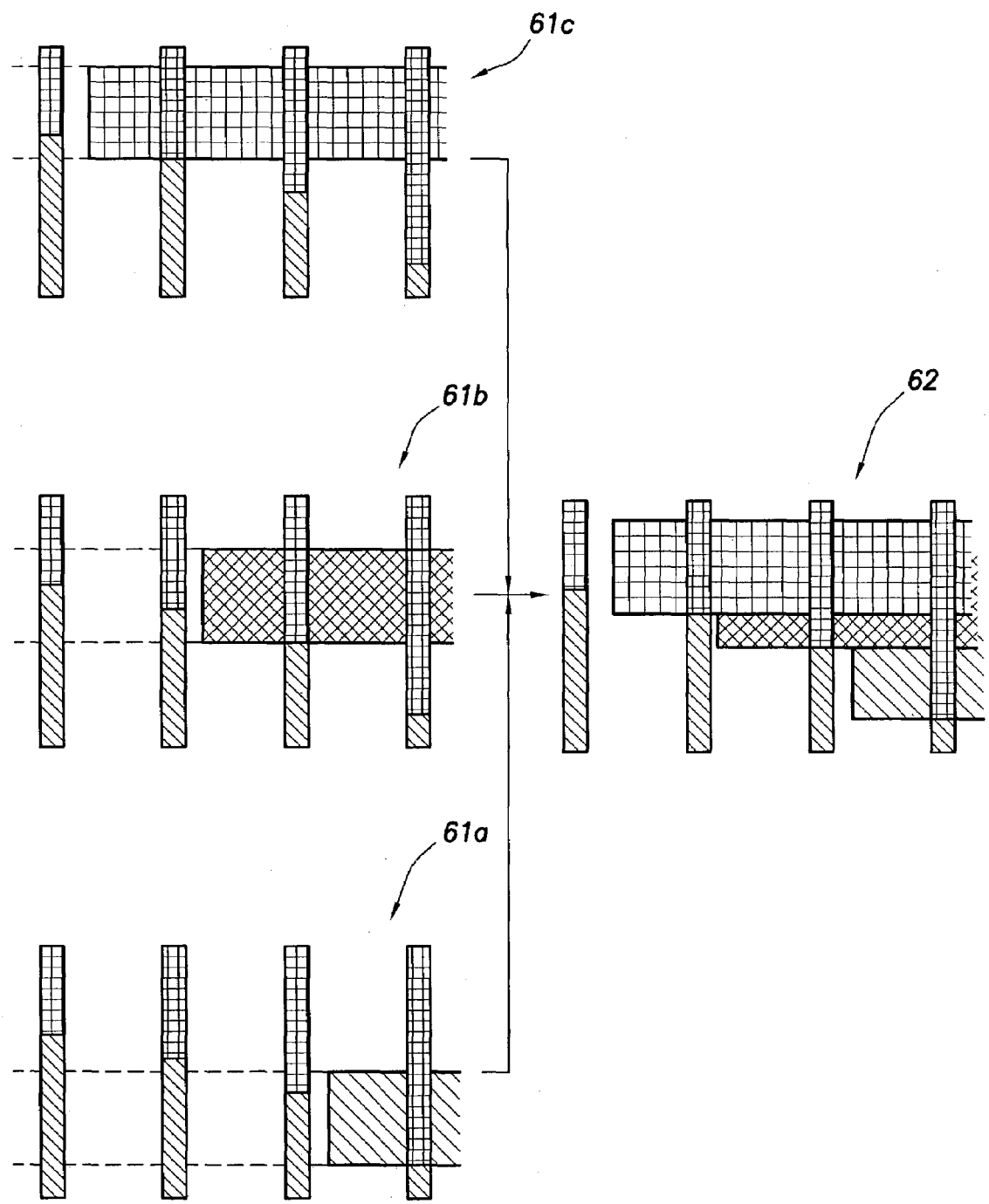
FIG. 22 illustrates the process of simulating channel scouring by surface truncation in Framework 3D software 29 of FIG. 2.

In FIGS. 11 and 22, at this point, it is necessary to simulate an occurrence, called 'scouring', whereby one channel will cut into another channel; that is, a later generated channel will erode away another previously generated channel. The Framework3D software 29, part of GeoFrame 24, will simulate the 'scouring' by surface truncation as illustrated in FIG. 22. Three simulations, of Channel Units 61a, 61b and 61c of FIG. 22, are submitted to surface truncation in the Framework3D software 29 to produce 2-D grids representing the configuration 62 in FIG. 22.

Export Final 2D Grids, step 18g of FIG. 11

When the 'scouring' is completed, the 'two-dimensional (2-D) grids of the original and eroded top and base surfaces of these channels' are transferred to the 'Property3D' software 28 of FIG. 2. The aforementioned 'two-dimensional (2-D) grids of the original and eroded top and base surfaces of these channels' represent the 'plurality of model realizations representing the architecture of a fluvial reservoir'.

Convert Grids to 3D, step 18h of FIG. 11

Export Final 3D Grids to FloGrid, step 18i of FIG. 11

Volumetrics, steps 18j and 18k of FIG. 11

Figure 23:
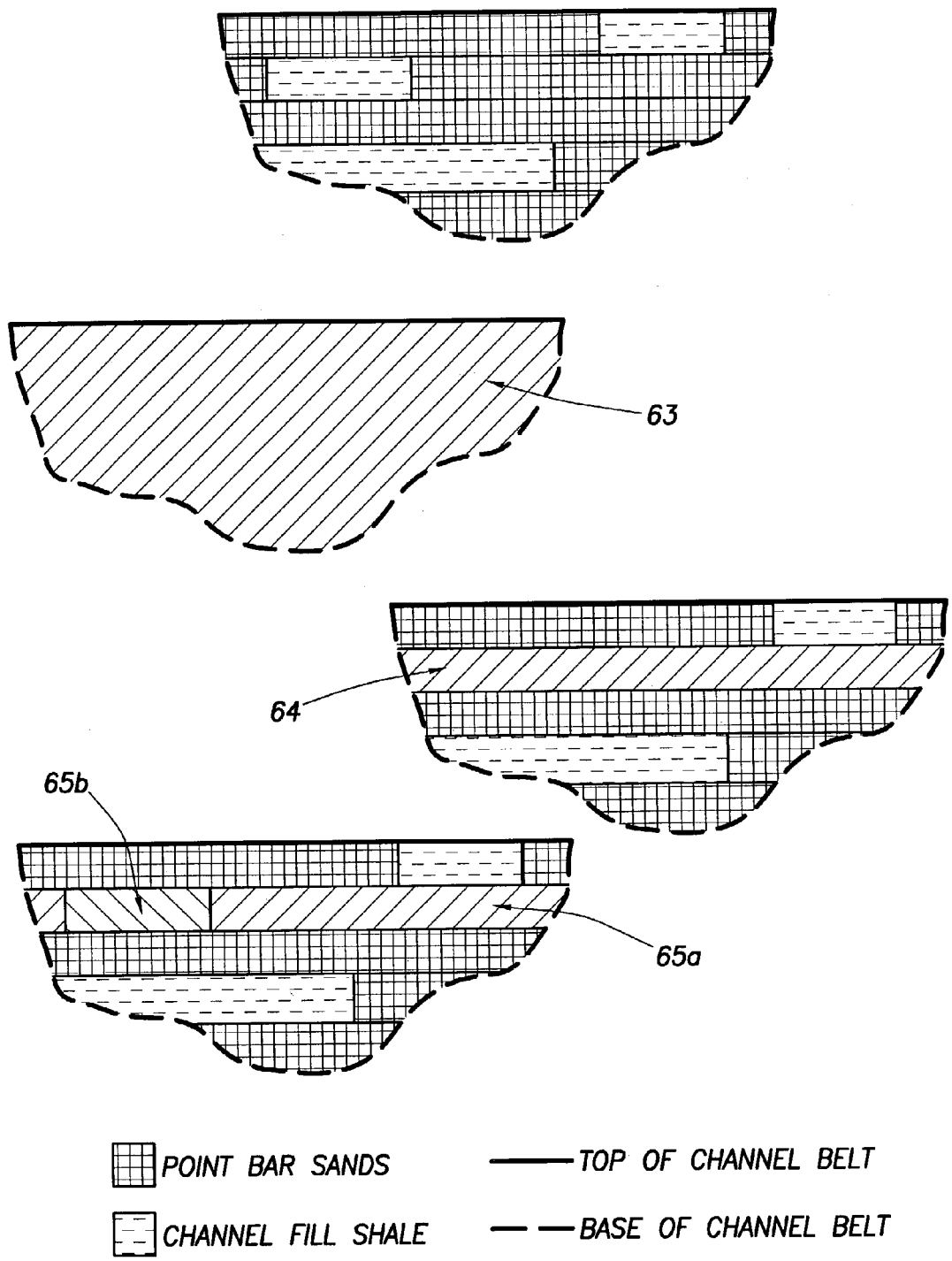
FIG. 23 illustrates the different rock volumes that can be calculated using the ChannelMod software.

In FIGS. 11 and 23, the 'two-dimensional (2D) grids of the original and eroded top and base surfaces of these channels' can now be converted to three dimensions (3-D) using the 'Property3D' software 28 and transferred to Flo-Grid 30 in RESCUE file format. The Volumetrics can be accomplished either in either step 18j using 'CPS' 26, or in step 18k using 'Property3D' 28. Referring to FIG. 23, step 18j is part of ChannelMod software 18 and allows calculation of total channel belt volume 63, channel unit volume 64, sand volume 65a, and shale volume 65b.

DETAILED DESCRIPTION OF THE INVENTION

The following 'Detailed Description of the Invention' represents a functional specification associated with the ChannelMod software 18 shown in FIG. 2 of the drawings. Refer now to FIGS. 24 through 45.

1. Introduction

The objectives of this document are to:
1. Record the philosophy and mathematical basis of the ChannelMod algorithm;
2. Provide guidance as to how the algorithm should be used.

ChannelMod was developed to provide a means of modeling fluvial reservoirs that would be complementary to FluvSim, the currently available method in GeoFrame. This was deemed necessary for two reasons:

a. Because FluvSim does not allow generation of realistic models representing the shale plugs that commonly form important barriers within fluvial reservoirs b. Because FluvSim does not provide grids that represent the bounding surfaces of the sand bodies; such grids are required under circumstances in which a deterministic reservoir model is to be simulated in Eclipse.

ChannelMod is designed to be used with GeoFrame. The grids are generated in CPS-3 so that they can be exported directly into FlowGrid. However, owing to lack of access to the GeoFrame code, the channel simulation itself is done in an Excel 2000 workbook. Ultimately it would probably be advisable to incorporate the Excel logic into GeoFrame code so that simulation and mapping can be done in a single environment. The next section of the report discusses the workflow under which information moves from Excel to GeoFrame and back to Excel.

Following the workflow discussion, the report describes in detail the structure and content of the Excel workbook containing the simulation algorithm. After this description, instructions are provided for applying ChannelMod.

2. Workflow

Figure 24:
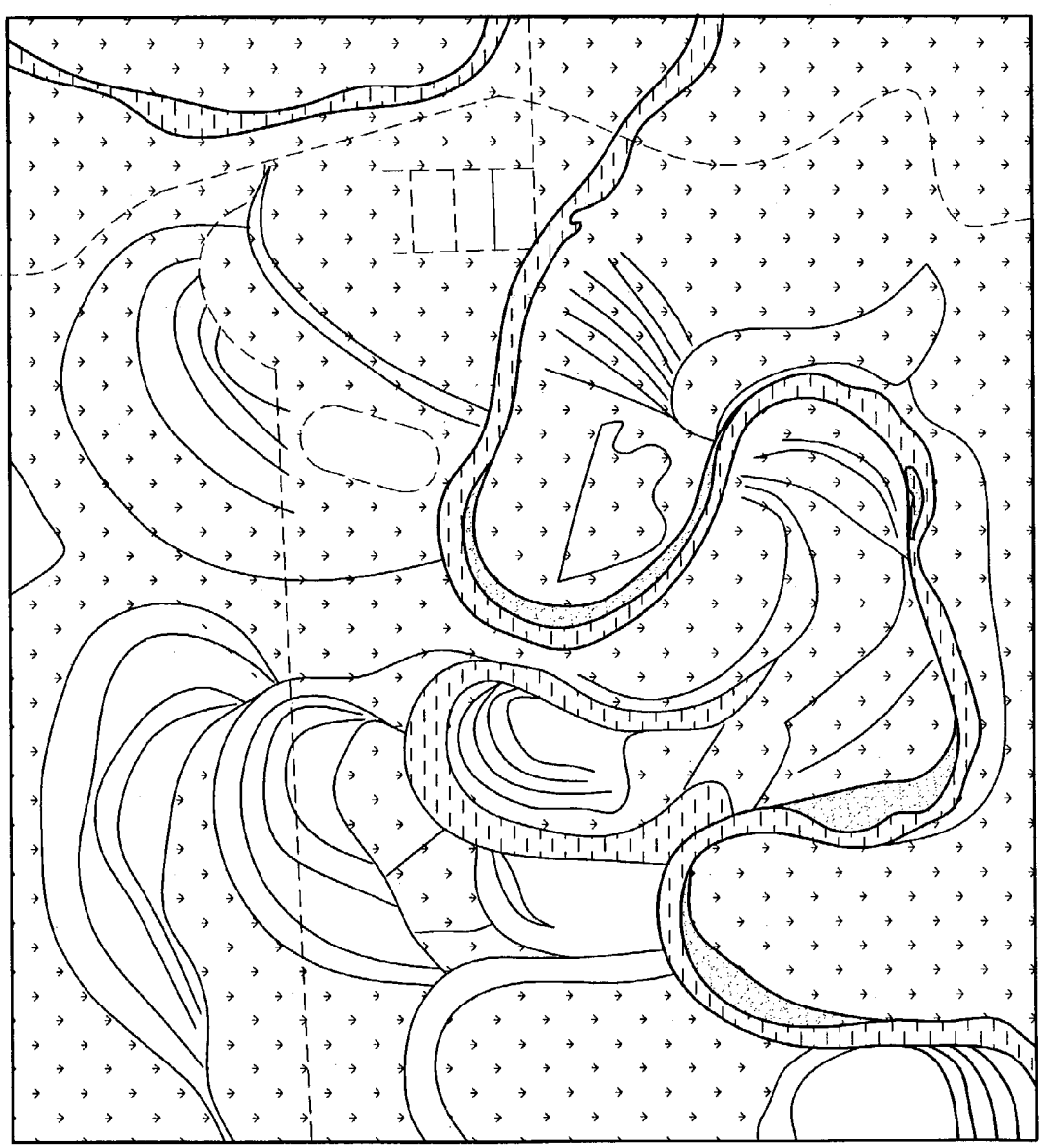

ChannelMod generates grids that represent the tops and bottoms of point bars and channel fills within a multi-storey channel belt that is a product of deposition from successive channel systems. The channel belt associated with a modern river is illustrated in FIG. 24, which shows how abandoned channel fills are partially preserved between point bar deposits.

A key requirement of the method is to generate grids that represent the channel fills, which commonly comprise mud and thus act as important barriers to fluid flow within reservoirs.

The ChannelMod system comprises 2 Excel workbooks and 4 CPS-3 macros:
ChannelMod*.xls
Export.xls
FRAME WORK.mac
VOLUMETRICS.mac
VOLUMETRICS_AOI.mac
Map.mac The workflow is shown in FIG. 11. It is assumed that all the well and seismic data that will provide constraint to the ChannelModel are contained within an existing GeoFrame project. The process begins with definition of the margins of the channel belt within GeoFrame. These margins are digitized and exported to the Excel workbook ChannelMod*.xls, in which the simulation is performed. After simulation, the resulting polygon and data files representing the modeled point bars and channel fills are exported to GeoFrame where CPS-3 is used to truncate each storey base and point bar top by successively younger storeys of the channel belt. Volumetrics can be calculated at this point. The final step is to convert the 2-D grids from CPS-3 into 3-D grids within Property3D.

3. The ChannelMod Simulation Algorithm

Figure 25:
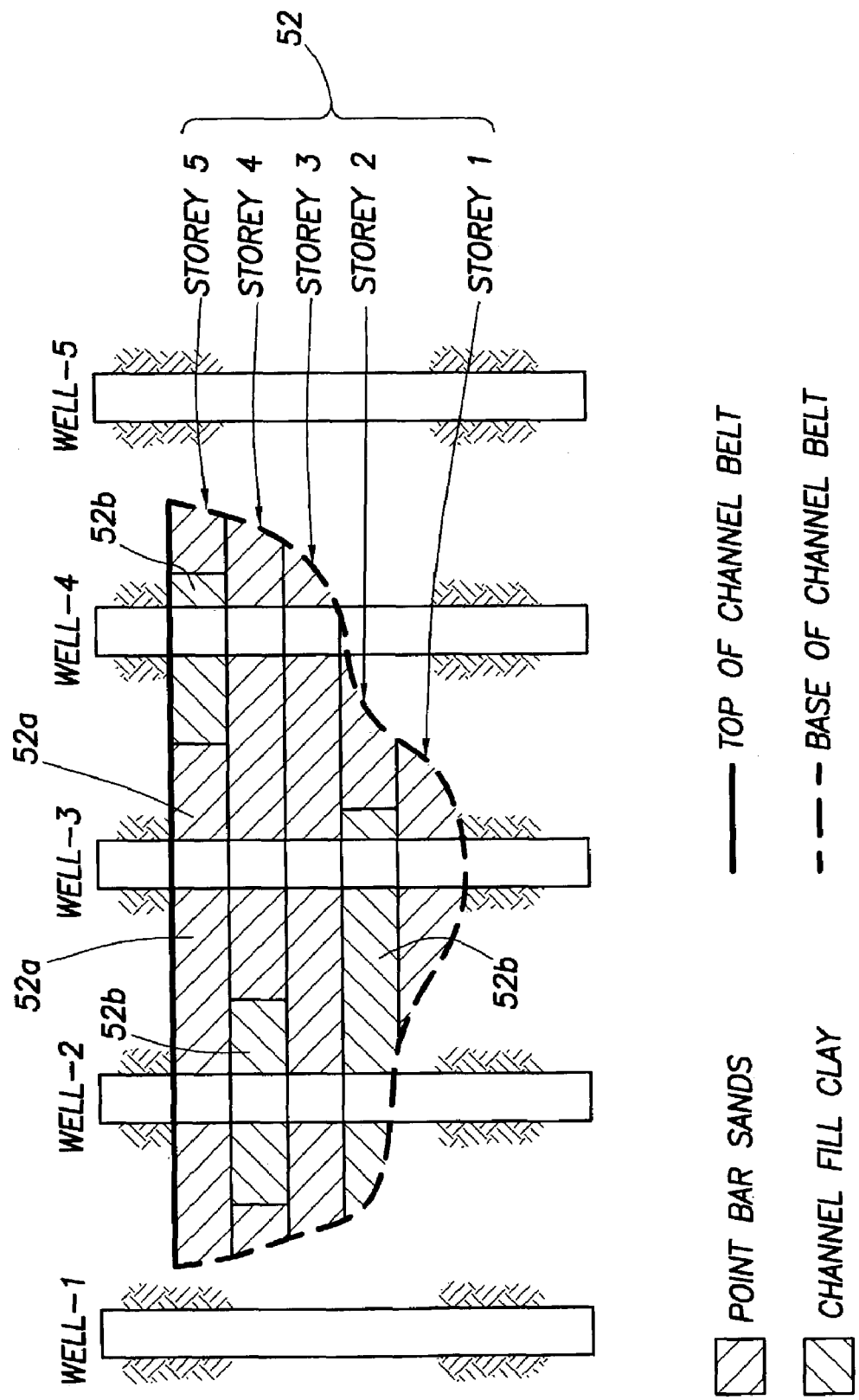
Figure 26:
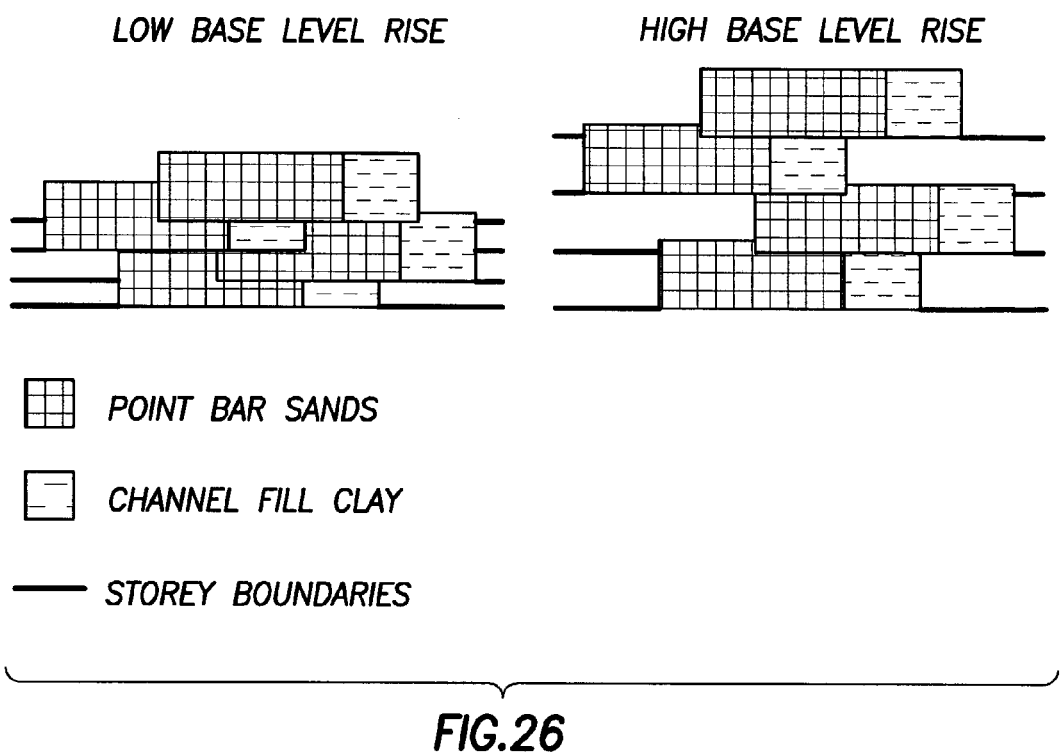
Figure 27:
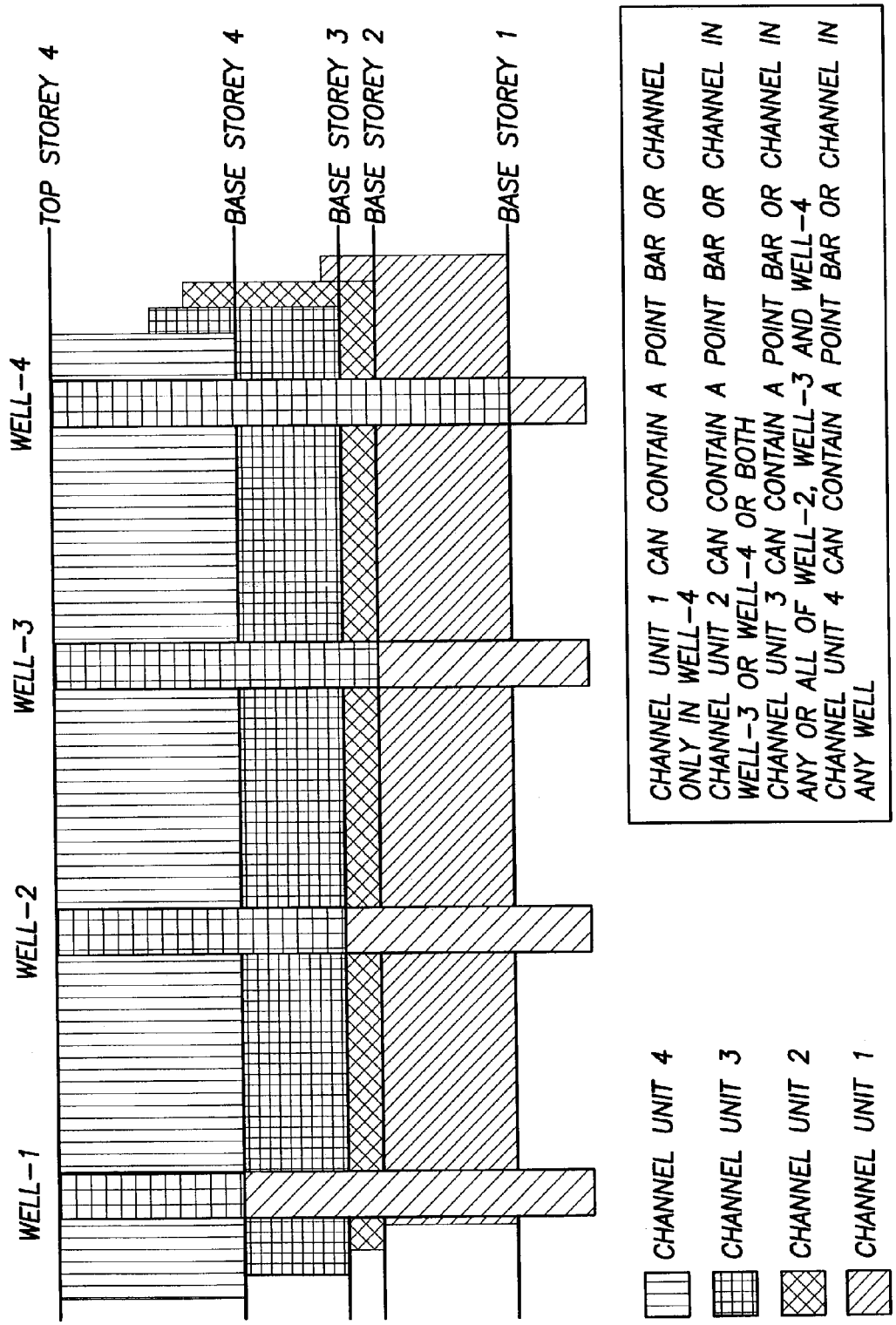

The algorithm is designed to model a channel and its associated point bars for all the storeys in a multi-storey channel belt. It is assumed that the channel belt is represented in all the wells penetrating it by a single interval comprising point bar sandstones or channel-fill shales. The base of this interval is set relative to the top, such that the depth of the base corresponds to the thickness of the channel belt (FIG. 25). This interval is divided into successive storeys, such that the relative depths of each successive storey represent the amount of rise in base level (FIG. 26). The interval of rock deposited before erosion to generate a storey is termed a "channel unit" (FIG. 27).

Each channel unit is modeled separately by one or more simulations. Simulation is repeated until all the wells representing a point bar or channel for the channel unit in question have been correctly located within point bars or channels (FIG. 27). For each simulation, one well is set as a data point to which the simulation is conditioned. The same well can be used in any number of simulations. In addition the algorithm determines how many of the other wells are correctly located.

The algorithm resides within Excel workbook ChannelMod*.xls, which contains 9 worksheets. The purpose of each of these is discussed below.

3.1. Input Polyline sheet

The purpose of this sheet is to interpolate X,Y values for the channel belt margins imported from GeoFrame. Up to 28 points can be imported; from these the worksheet interpolates 2 Y values (representing the margins of the channel belt) for each of 121 X values.

3.2. Input Parameters sheet

Figure 28:
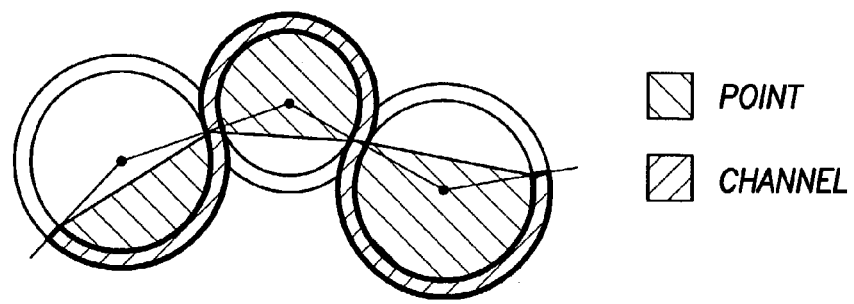

All the input parameters are specified in this sheet. Point bars and channel fills are assumed to be bounded by a combination of circle segments and circle chords, as shown in FIG. 28.

Variation is allowed in the radius of each successive bounding circle by random proportions of a maximum percentage of a defined base radius. Variation in channel width is similarly defined. The extent to which the channel bends back on itself is controlled by means of a parameter termed "Wiggle Control", which can comprise any number greater than or equal to 0.5. The larger the number, the closer will be the center of each circle to the center of the channel belt.

Other parameters defined in this sheet are the thicknesses of the channel belt and the channel belt storeys and the depths to the top and base of the story being modeled. The sheet also specifies the locations of all the wells that provide constraint on the location of the channel belt, channels and point bars, and the location of the particular well to which the model is being conditioned.

3.3. Calculation—Point Bar sheet

Figure 29:
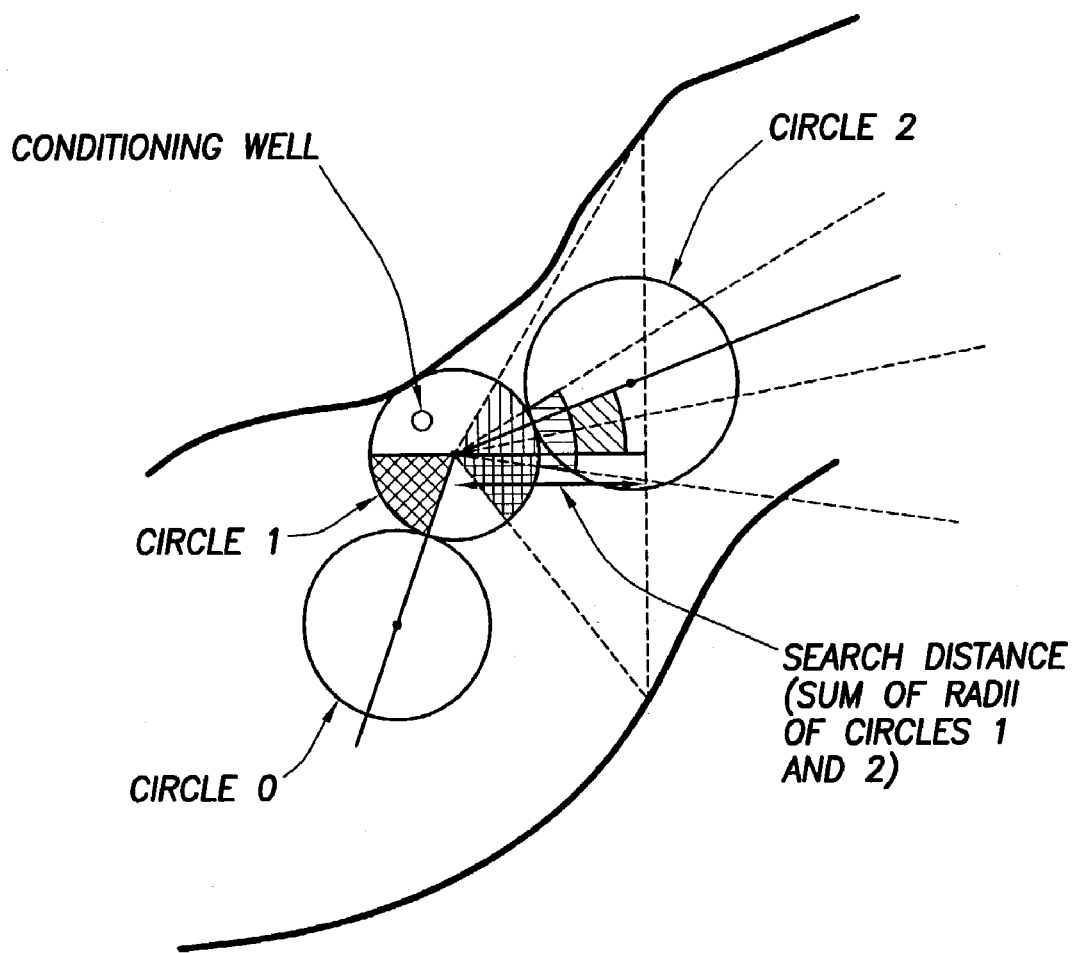

The simulated channel path is constrained to stay almost entirely within the defined channel belt by ensuring that the maximum and minimum Y values of each circle are respectively less than and greater than the maximum and minimum Y values of the channel belt margin at a certain search distance from the center of the previous circle, as illustrated in FIG. 29. The search distance is set at the sum of the radii of the circle in question and the previous circle.

The worksheet generates a channel containing 21 loops based on 21 circles placed as shown in FIG. 29. Each re-calculation of the sheet generates a new simulation, or realization. In each case, the conditioning well specified in the Input Parameters sheet falls within the point bar of Circle 1. The worksheet also determines whether each of the other wells specified in the Input Parameters sheet falls inside or outside a point bar.

3.4. Calculation—Channel sheet

This sheet differs from the Calculation—Point Bar sheet only in forcing the conditioning well to fall within a channel, and in determining whether each of the other wells falls inside or outside a channel.

3.5. Chart—Point Bar sheet

Figure 30:
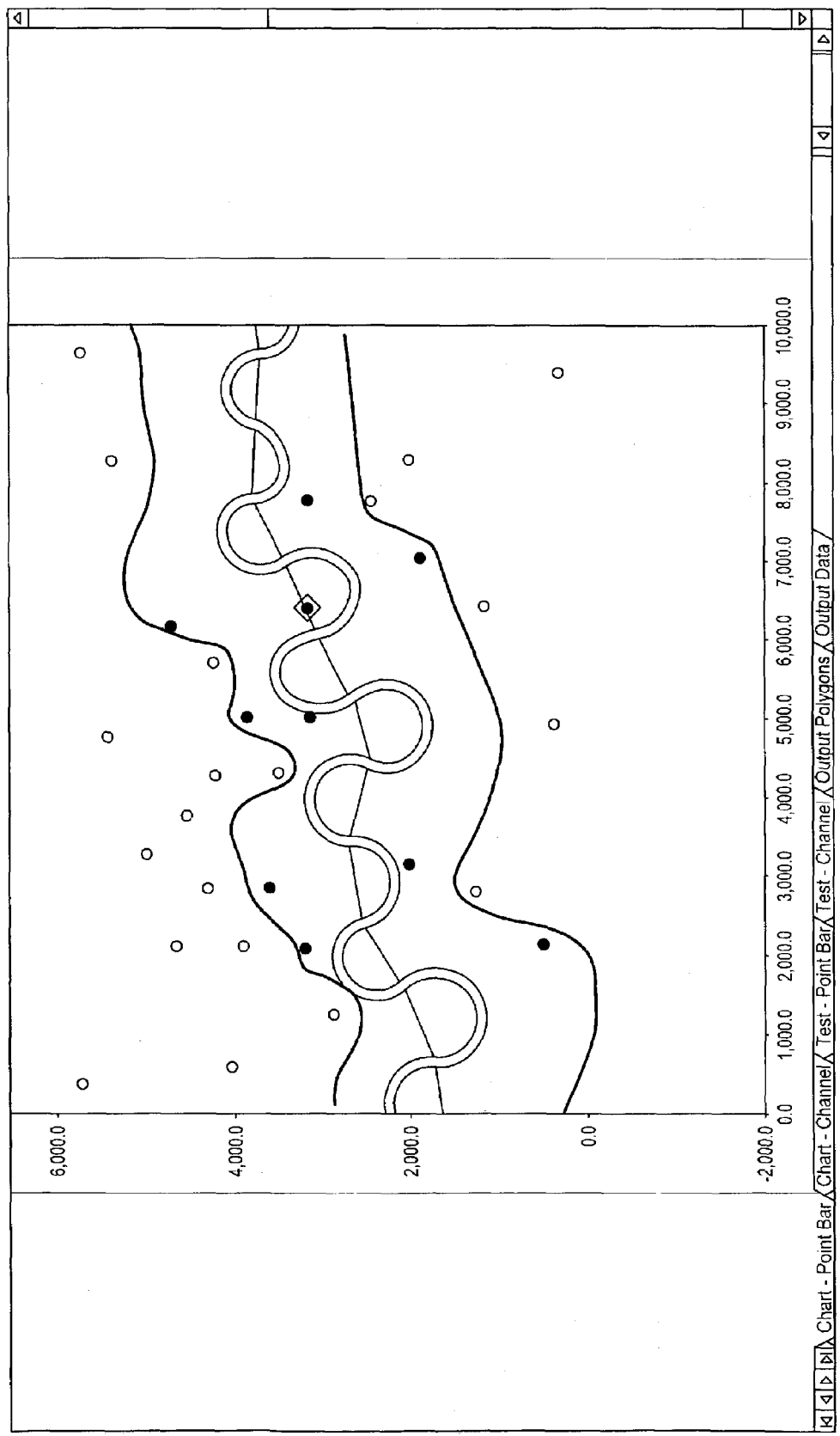

This chart shows a map of the channel and point bar boundaries for the simulation that was last performed, together with the boundaries of the channel belt and the locations of the conditioning well and all other control points (FIG. 30).

3.6. Test—Point Bar sheet

This sheet indicates how many of the wells are modeled correctly, in simulations conditioned to a well inside a point bar, as falling inside or outside a point bar or channel. It also allows the top and base of each successive story to be recorded.

3.7. Test—Channel sheet

This sheet is similar to the Test—Point Bar sheet except that it indicates results for simulations conditioned to a well inside a channel.

3.8. Output Polygons

This sheet contains the X,Y coordinates of the polygons that bound all the point bars and channel fills of the realization that was last performed. Successive realizations may be exported to a single workbook (Export.xls) using a macro entitled "Export" within ChannelMod*.xls.

3.9. Output Data

This sheet contains Z values corresponding to the top and base of the storey for all of the points specified in the Output Polygons sheet. These values are exported at the same time as the polygons when the "Export" macro is run.

4. Instructions for Use 4.1. In GeoFrame CPS-3

Figure 31:
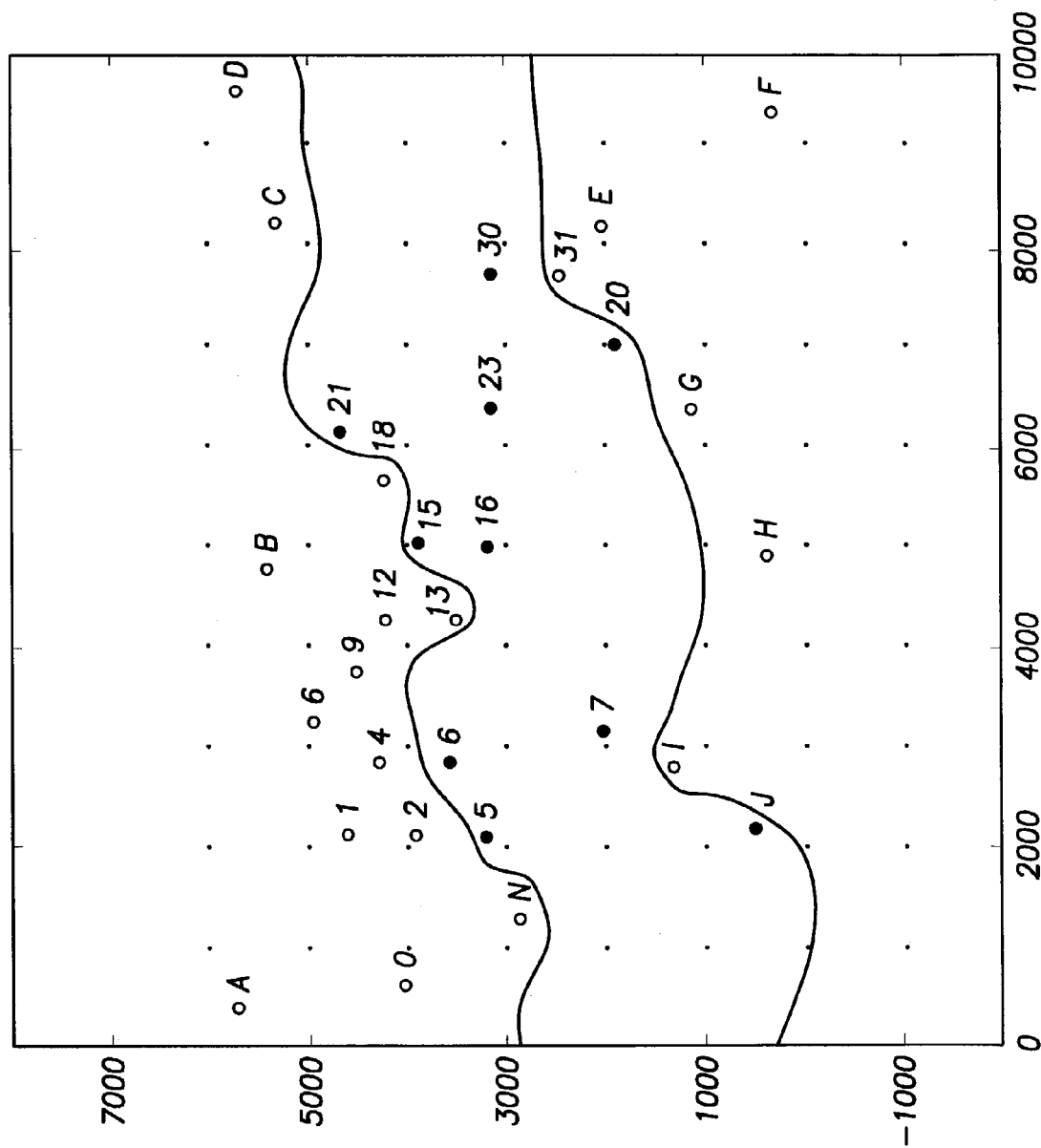

4.1.1. Digitize channel belt margins as polyline (FIG. 31).

4.1.2. Export as ASCII file.

4.2. In Excel 4.2.1. Copy workbooks ChannelMod*.xls and Export.xls into project directory.

4.2.2. Open Export.xls and delete all worksheets except Sheet 1, which should be blank.

4.2.3. Open ChannelMod*.xls.

4.2.4. Open ASCII file created in step 4.1.2 and copy to "Input Polyline" sheet of ChannelMod*.xls (FIG. 32).

4.2.5. Set input parameters on "Input Parameters" sheet of ChannelMod*xls, including the depth to the top of the storey to be modeled (FIG. 33).

4.2.6. Input well locations and depths to channel belt base, relative to the top of the channel belt in each well, to "Input Parameters" sheet and sort the wells in order of decreasing channel belt thickness (FIG. 33).

4.2.7. Insert the value 1 in columns B and E of the "Test—Point Bar" or "Test—Channel" sheet for each well located in a point bar or channel for the storey being modeled (FIG. 34). Start with a storey corresponding to the thickest channel belt.

4.2.8. Copy the X,Y coordinates of the well selected for conditioning into cells B14 and B15 of the "Input Parameters" sheet (FIG. 33).

4.2.9. Set workbook to Manual calculation without "Recalculate before Save".

4.2.10. From the "Test—Point Bar" or "Test—Channel" sheet, run macro "ChkFirstUntil" to run first simulation. This will generate a realization having the correct number of wells located outside point bars and channels (FIG. 34).

4.2.11. Check to see how many wells are correctly located within a point bar or channel (FIG. 34). For each correct well, set the base and top of the appropriate storey to the depths specified in the "Input Parameters" sheet. Run macro "Export" in ChannelMod*.xls to copy output polygons and data to new worksheets in Export.xls.

4.2.12. If the first simulation does not correctly locate all the wells for the storey being modeled in point bars or channels, run macro "ChkFirstUntil" repeatedly until that condition is met. Run macro "Export" in ChannelMod*.xls.

4.2.13. Repeat Steps 4.2.8 to 4.2.13, working down the list of wells in point bars or channels until each well has been modeled within a channel in at least one realization. The conditioning option can be used for any well that is difficult to fit. In each case, any number of wells with deeper storey bases than in the well in question can be located within the same channel as the latter well (FIG. 27).

4.2.14. Delete text files Book1.txt to Book40.txt in destination directory.

Figure 35:
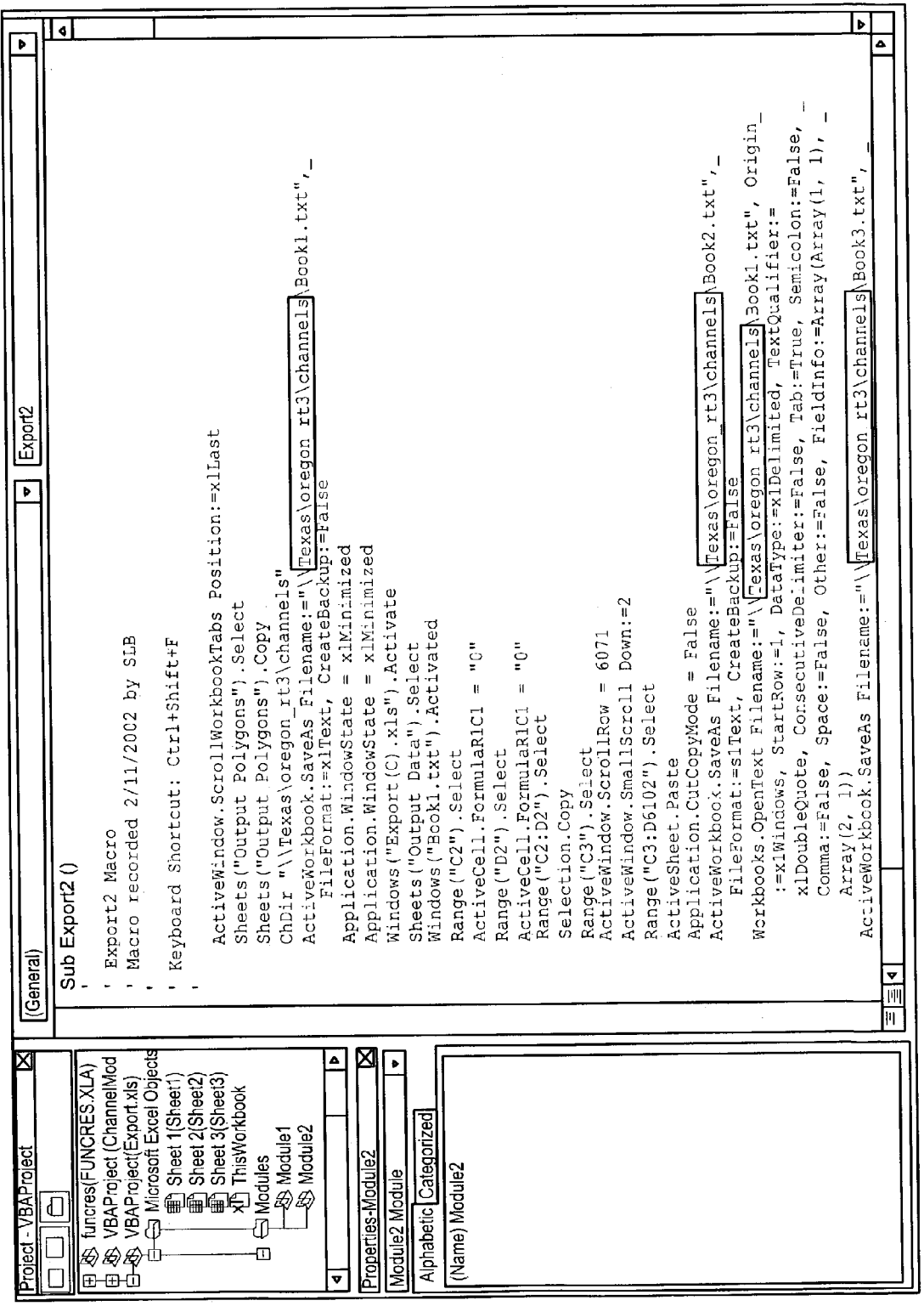
Figure 36:
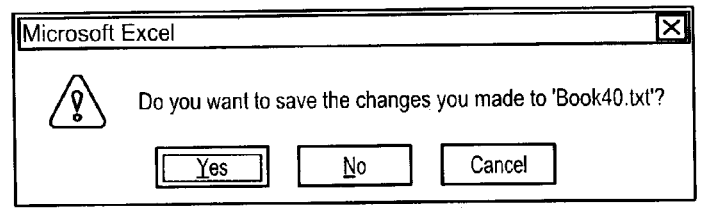
Figure 37:
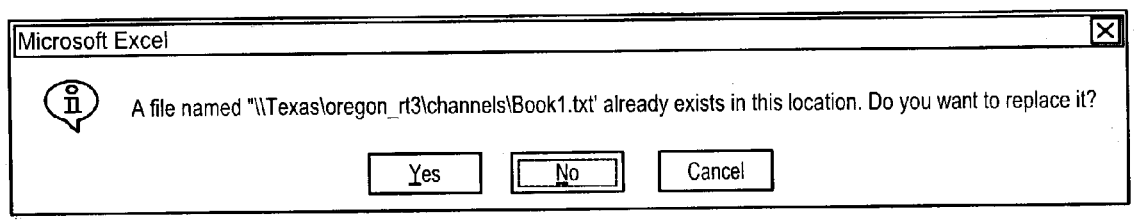
Figure 38:
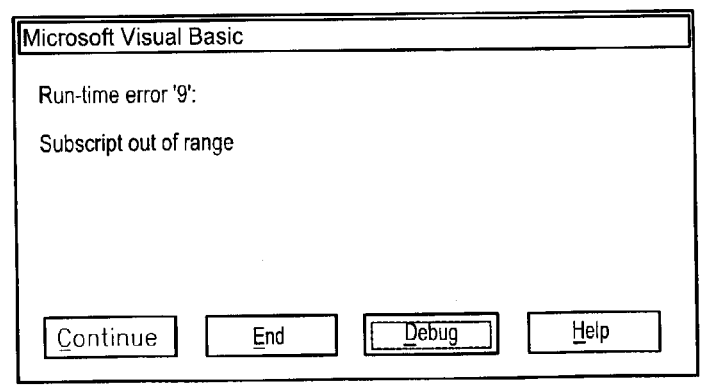

4.2.15. Edit macro "Export2" in Export.xls to ensure that correct destination directory is specified (FIG. 35). Then run macro "Export2" to copy all output polygons and data to text files Book1.txt to Book40.txt. Files in excess of number of channels modeled will automatically be assigned the same polygons as the first ChannelModeled, and data values of zero so that they do not truncate older surfaces. After starting the macro, click on the icon for Export.xls. When the macro has finished creating files Book1.txt to Book40.txt, a dialogue box will come up (FIG. 36); the answer to this question is "No", for the first and all subsequent boxes asking the same question. The box will come up twice, and then another box will appear, to which the answer is "Yes" (FIG. 37). A long series of boxes will then appear, to which the answers are alternately "No" (for FIG. 36 type) and "Yes" (for FIG. 37 type). Finally, the box shown in FIG. 38 will appear; the "End" button should be pressed.

4.3. In GeoFrame CPS-3

4.3.1. Select modeling and display environment that will areally encompass all channel realizations.

4.3.2. Digitize area of interest (e.g. lease area) as a sub-area of the project area if desired.

4.3.3. Copy macro files FRAMEWORK.mac, VOLUMETRICS.mac, VOLUMETRICS_AOI.mac and Map.mac to the CPS directory.

4.3.4. Edit macro "FRAMEWORK" to ensure that correct source directory is specified for importing text files Book1.txt to Book40.txt (FIG. 39). Run macro "FRAMEWORK" to generate truncated and gridded surfaces.

Figure 40:
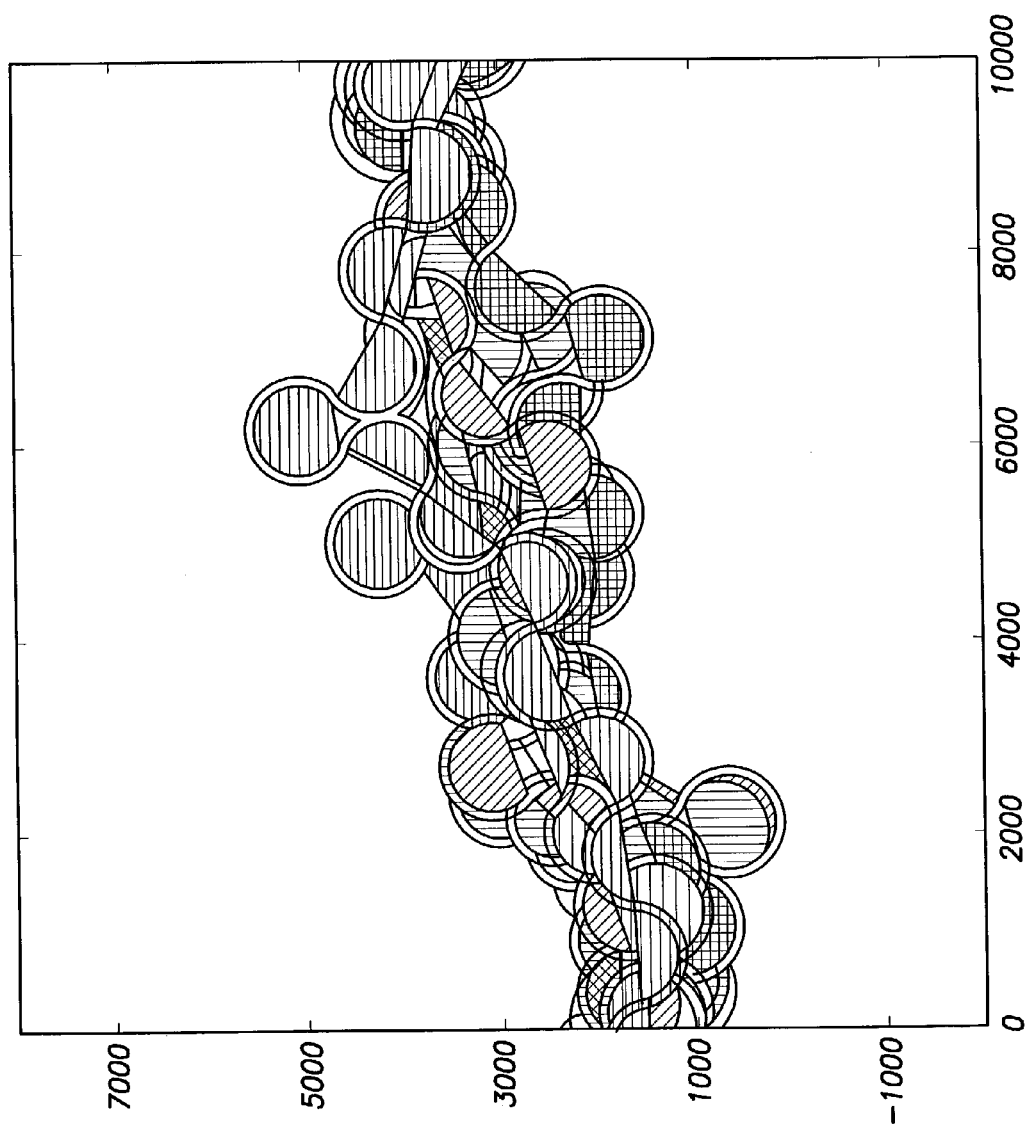

4.3.5. If desired, run macro "Map" to generate map of channels (FIG. 40).

4.3.6. Open Model Editor and load surface D1_base_merged_trunc, making the contour maximum and the contour interval both greater than the maximum thickness of the channel belt.

Figure 41:
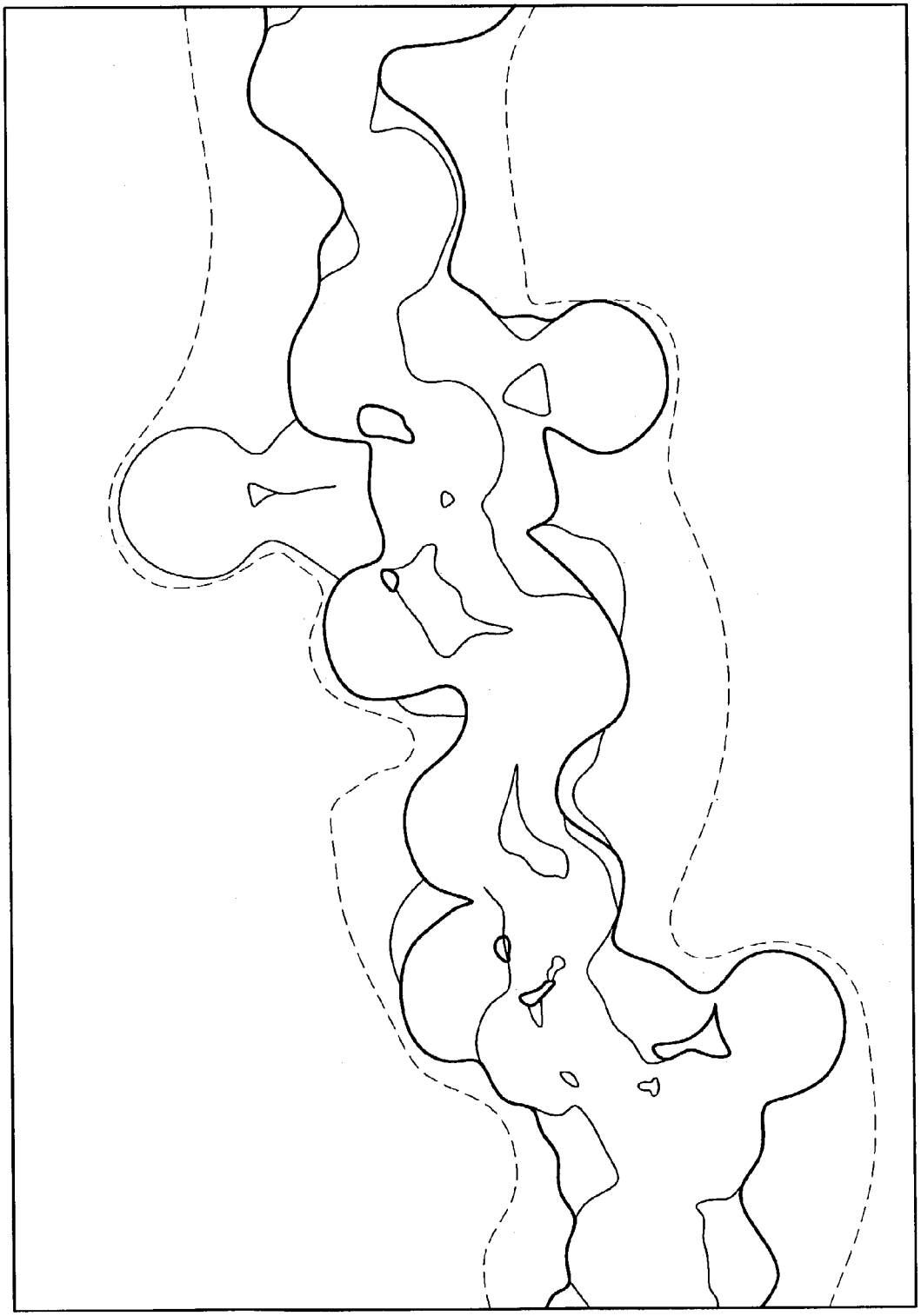

4.3.7. In Model Editor, create a closed polygon corresponding to the channel belt margins (FIG. 41).

4.3.8. Add −1 to all grid values inside the polygon and set all grid values outside the polygon to NULL. Save the resulting surface as CB_base.

4.3.9. Close Model Editor.

4.3.10. Back in the Main Module of CPS-3, perform Single Surface Logical Operation (B=b, if A=a, otherwise B=A) to substitute the minimum base storey depth for the −1 grid node values in surface CB_base (use the name CB_base as output).

4.3.11. Perform Multiple Surfaces Logical Operation (C=MAX(A,B) If A or B is NULL, then C=NULL) to create a corrected Base Channel Belt surface from surfaces CB_base and D1_base_merged_trunc (use name CB_base as output).

Figure 42:
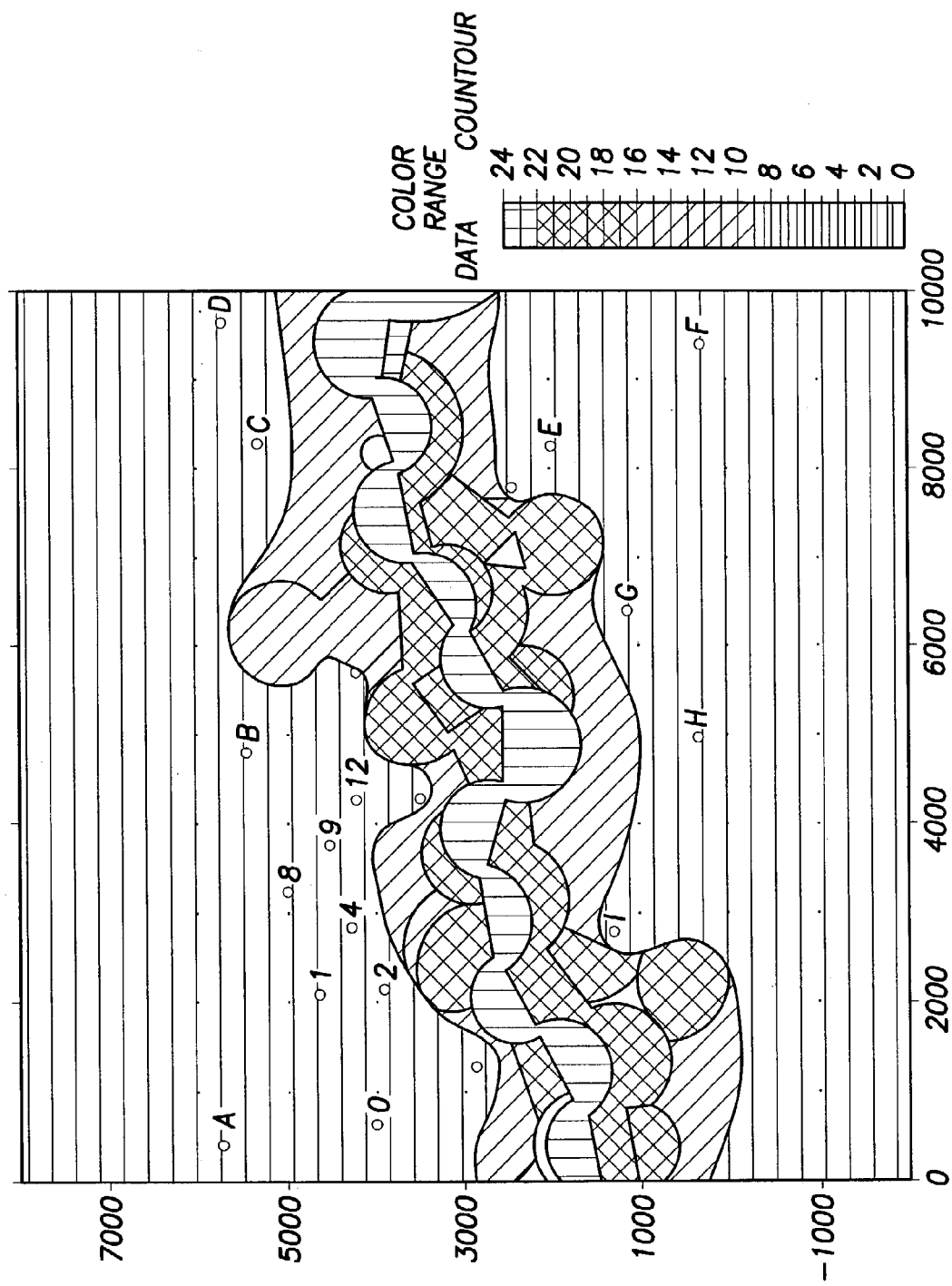

4.3.12. If desired, use Display functions in CPS-3 Main Module to generate a map of the base of the channel belt (FIG. 42).

4.3.13. Perform another Single Surface Logical Operation (B=b, if A=a, otherwise B=A) to substitute zero values for the NULL grid node values in surface CB_base (use the name CB_base as output).

4.3.14. Copy D20_top as CB_top.

4.3.15. Transfer the grids for CB_base and CB_Top to GeoFrame, remembering to set attributes with named surfaces.

4.3.16. In Framework3D, create a structural framework from CB_Top and CB_Base.

4.3.17. Volumetrics can be calculated in CPS-3 using macros as described in the following steps, or they can be derived in Property3D using Grid Operations.

4.3.18. Edit Macros "VOLUMETRICS" and "VOLUMETRICS_AOI" to ensure that the correct destination directory is specified for the volumetric output (FIG. 43).

4.3.19. Run Macro "VOLUMETRICS" to generate text file of results for entire channel belt (rjames.vlm) after deleting all data from previous runs in rjames.vlm.

4.3.20. Run Macro "VOLUMETRICS_AOI" to generate text file of results for channel belt within the area of interest (rjames.vlm) after deleting all data from previous runs in rjames.vlm.

4.4. In GeoFrame Property3D 4.4.1. Create a structural model from the above structural framework 4.4.2. Use Direct Assignment in Property Population Manager to create 3-D grids corresponding to the CPS grids for channel fills (i.e. same value throughout columns at each X,Y location). Name them D1_CF_Top, D1_Base, etc.

4.4.3. Multiply the ZAverage grid by −1 to convert it to a depth grid 4.4.4. Use Blank Maximum and Blank Minimum in Grid Operations to create depth grids that have non-null values only between top and base of each channel. Name them D1_CF_Top_Depth, D1_Base_Depth, etc.

4.4.5. Use Direct Assignment in Property Population Manager to overwrite non-null depth values with value 1. Name the grids D1_CF_Flag, etc. The value 1 will represent channel fills.

4.4.6. Use Direct Assignment in Property Population Manager to overwrite null depth values with value 0. Overwrite the D*_CF_Flag grids. The value 0 will represent point bars.

4.4.7. Add all of the D*_CF_Flag grids together to create a composite flag grid (e.g. CB_CF_Flag).

4.4.8. Correct for any edge effects by using Direct Assignment in Property Population Manager to overwrite all Flag values greater than 1 with the value 1. Overwrite the CB_Flag grid.

4.5. In Excel 4.5.1. In ChannelMod*.xls, edit macro "Vol_Import" to ensure that correct source directory is specified (FIG. 44).

4.5.2. In ChannelMod*.xls, run macro "Vol_Import" to create workbook Vol_Table.xls (FIG. 45).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for modeling a point bar associated with a multistory channel belt, comprising:
   (a) in response to a plurality of rock classifications selected from a group consisting of channel, splay, and floodplain, generating a first two dimensional grid representing a grid of a top of the point bar and generating a second two dimensional grid representing a grid of a bottom of the point bar within the multi-story channel belt; and
   (b) in response to the first and second two dimensional grids representing said grid of the top and the bottom of the point bar, generating a three dimensional grid representing a volume of said point bar including said grid of the top of said point bar, said grid of the bottom of said point bar, and a grid of a side of said point bar.

2. The method of claim 1, wherein the generating step (b) comprises:
   truncating said two dimensional grids adapted for simulating channel erosion, and, responsive thereto, generating said three dimensional grid representing said volume of said point bar.

3. The method of claim 1, further comprising:
   (c) in response to said three dimensional grid, generating a simulation grid output; and
   (d) in response to said simulation grid output, generating a plurality of simulation results adapted to be displayed on a display.

4. The method of claim 1, wherein the first two dimensional grid and the second two dimensional grid are generated in response to the rock classifications and a set of limits of the channel belt and a plurality of settings assigned to a respective plurality of input parameters, and wherein the generating step (a), adapted for generating said first two dimensional grid representing a grid of a top of the point bar and generating said second two dimensional grid representing a grid of a bottom of the point bar within the multi-story channel belt, comprises:
   (c) in response to said plurality of settings assigned, respectively, to said plurality of input parameters, generating a plurality of channels and a plurality of statistical realizations corresponding, respectively, to the plurality of channels.

5. The method of claim 4, wherein the generating step (a), adapted for generating said first two dimensional grid representing a grid of a top of the point bar and generating said second two dimensional grid representing a grid of a bottom of the point bar within the multi-story channel belt, further comprises:
   (d) in response to the plurality of statistical realizations corresponding, respectively, to the plurality of channels, rejecting one or more of said plurality of statistical realizations as invalid statistical realizations on the condition that said invalid statistical realizations indicates that there is a sand body in a particular well and it is known that shale, and not sand, exists in said particular well, and thereby generating one or more valid statistical realizations.

6. The method of claim 5, wherein each of the valid statistical realizations correspond to a two dimensional grid representing a top of a modeled point bar and a two dimensional grid representing a bottom or base of the modeled point bar, and wherein the generating step (a), adapted for generating said first two dimensional grid representing a grid of a top of the point bar and generating said second two dimensional grid representing a grid of a bottom of the point bar within the multi-story channel belt, further comprises:
   (e) in response to said valid statistical realizations, saving, for each valid statistical realization, the grids representing the tops and bases of the modeled point bar.

7. The method of claim 6, wherein the generating step (a), adapted for generating said first two dimensional grid representing a grid of a top of the point bar and generating said second two dimensional grid representing a grid of a bottom of the point bar within the multi-story channel belt, further comprises:

(f) simulating scour by surface truncation wherein a later generated channel erodes away another previously generated channel.

8. The method of claim 7, wherein the generating step (b) comprises:
   truncating said two dimensional grids adapted for simulating channel erosion, and, responsive thereto, generating said three dimensional grid representing said volume of said point bar.

9. The method of claim 8, further comprising:
   (g) in response to said three dimensional grid, generating a simulation grid output; and
   (h) in response to said simulation grid output, generating a plurality of simulation results adapted to be displayed on a display.

10. The method of claim 9, wherein the generating step (g) comprises:
    generating a structured simulation grid from a structured gridder, and in response to the structured simulation grid, generating said simulation grid output from an upscaler.

11. The method of claim 10, wherein the generating step (g) further comprises:
    generating a simulation grid output from a unstructured gridder.

12. A computer program adapted to be executed by a processor, said computer program, when executed by said processor, conducting a process for modeling a point bar associated with a multi-story channel belt, said process comprising:
    (a) in response to a plurality of rock classifications selected from a group consisting of channel, splay, and floodplain, generating a first two dimensional grid representing a grid of a top of the point bar and generating a second two dimensional grid representing a grid of a bottom of the point bar within the multi-story channel belt; and
    (b) in response to the first and second two dimensional grids representing said grid of the top and the bottom of the point bar, generating a three dimensional grid representing a volume of said point bar including said grid of the top of said point bar, said grid of the bottom of said point bar, and a grid of a side of said point bar.

13. The computer program of claim 12, wherein the generating step (b) comprises:
    truncating said two dimensional grids adapted for simulating channel erosion, and, responsive thereto, generating said three dimensional grid representing said volume of said point bar.

14. The computer program of claim 12, further comprising:
    (c) in response to said three dimensional grid, generating a simulation grid output; and
    (d) in response to said simulation grid output, generating a plurality of simulation results adapted to be displayed on a display.

15. The computer program of claim 12, wherein the first two dimensional grid and the second two dimensional grid are generated in response to the rock classifications and a set of limits of the channel belt and a plurality of settings assigned to a respective plurality of input parameters, and wherein the generating step (a), adapted for generating said first two dimensional grid representing a grid of a top of the point bar and generating said second two dimensional grid representing a grid of a bottom of the point bar within the multi-story channel belt, comprises:

(c) in response to said plurality of settings assigned, respectively, to said plurality of input parameters, generating a plurality of channels and a plurality of statistical realizations corresponding, respectively, to the plurality of channels.

16. The computer program of claim 15, wherein the generating step (a), adapted for generating said first two dimensional grid representing a grid of a top of the point bar and generating said second two dimensional grid representing a grid of a bottom of the point bar within the multi-story channel belt, further comprises:
    (d) in response to the plurality of statistical realizations corresponding, respectively, to the plurality of channels, rejecting one or more of said plurality of statistical realizations as invalid statistical realizations on the condition that said invalid statistical realizations indicates that there is a sand body in a particular well and it is known that shale, and not sand, exists in said particular well, and thereby generating one or more valid statistical realizations.

17. The computer program of claim 16, wherein each of the valid statistical realizations correspond to a two dimensional grid representing a top of a modeled point bar and a two dimensional grid representing a bottom or base of the modeled point bar, and wherein the generating step (a), adapted for generating said first two dimensional grid representing a grid of a top of the point bar and generating said second two dimensional grid representing a grid of a bottom of the point bar within the multi-story channel belt, further comprises:
    (e) in response to said valid statistical realizations, saving, for each valid statistical realization, the grids representing the tops and bases of the modeled point bar.

18. The computer program of claim 17, wherein the generating step (a), adapted for generating said first two dimensional grid representing a grid of a top of the point bar and generating said second two dimensional grid representing a grid of a bottom of the point bar within the multi-story channel belt, further comprises:
    (f) simulating scour by surface truncation wherein a later generated channel erodes away another previously generated channel.

19. The computer program of claim 18, wherein the generating step (b) comprises:
    truncating said two dimensional grids adapted for simulating channel erosion, and, responsive thereto, generating said thee dimensional grid representing said volume of said point bar.

20. The computer program of claim 19, further comprising:
    (g) in response to said three dimensional grid, generating a simulation grid output; and
    (h) in response to said simulation grid output, generating a plurality of simulation results adapted to be displayed on a display.

21. The computer program of claim 20, wherein the generating step (g) comprises:
    generating a structured simulation grid from a structured gridder, and in response to the structured simulation grid, generating said simulation grid output from an upscaler.

22. The computer program of claim 21, wherein the generating step (g) further comprises:
    generating a simulation grid output from a unstructured gridder.

23. A program storage device readable by a machine and storing a set of instructions executable by the machine to perform method steps for modeling a point bar associated with a multi-story channel belt, said method steps comprising:

(a) in response to a plurality of rock classifications selected from a group consisting of channel, splay, and floodplain, generating a first two dimensional grid representing a grid of a top of the point bar and generating a second two dimensional grid representing a grid of a bottom of the point bar within the multi-story channel belt; and (b) in response to the first and second two dimensional grids representing said grid of the top and the bottom of the point bar, generating a three dimensional grid representing a volume of said point bar including said grid of the top of said point bar, said grid of the bottom of said point bar, and a grid of a side of said point bar.

24. The program storage device of claim 23, wherein the generating step (b) comprises:

truncating said two dimensional grids adapted for simulating channel erosion, and, responsive thereto, generating said three dimensional grid representing said volume of said point bar.

25. The program storage device of claim 23, further comprising:

(c) in response to said three dimensional grid, generating a simulation grid output; and (d) in response to said simulation grid output, generating a plurality of simulation results adapted to be displayed on a display.

26. The program storage device of claim 23, wherein the first two dimensional grid and the second two dimensional grid are generated in response to the rock classifications and a set of limits of the channel belt and a plurality of settings assigned to a respective plurality of input parameters, and wherein the generating step (a), adapted for generating said first two dimensional grid representing a grid of a top of the point bar and generating said second two dimensional grid representing a grid of a bottom of the point bar within the multi-story channel belt, comprises:

(c) in response to said plurality of settings assigned, respectively, to said plurality of input parameters, generating a plurality of channels and a plurality of statistical realizations corresponding, respectively, to the plurality of channels.

27. The program storage device of claim 26, wherein the generating step (a), adapted for generating said first two dimensional grid representing a grid of a top of the point bar and generating said second two dimensional grid representing a grid of a bottom of the point bar within the multi-story channel belt, further comprises:

(d) in response to the plurality of statistical realizations corresponding, respectively, to the plurality of channels, rejecting one or more of said plurality of statistical realizations as invalid statistical realizations on the condition that said invalid statistical realizations indicates that there is a sand body in a particular well and it is known that shale, and not sand, exists in said particular well, and thereby generating one or more valid statistical realizations.

28. The program storage device of claim 27, wherein each of the valid statistical realizations correspond to a two dimensional grid representing a top of a modeled point bar and a two dimensional grid representing a bottom or base of the modeled point bar, and wherein the generating step (a), adapted for generating said first two dimensional grid representing a grid of a top of the point bar and generating said second two dimensional grid representing a grid of a bottom of the point bar within the multi-story channel belt, further comprises:

(e) in response to said valid statistical realizations, saving, for each valid statistical realization, the grids representing the tops and bases of the modeled point bar.

29. The program storage device of claim 28, wherein the generating step (a), adapted for generating said first two dimensional grid representing a grid of a top of the point bar and generating said second two dimensional grid representing a grid of a bottom of the point bar within the multi-story channel belt, further comprises:

simulating scour by surface truncation wherein a later generated channel erodes away another previously generated channel.

30. The program storage device of claim 29, wherein the generating step (b) comprises:

truncating said two dimensional grids adapted for simulating channel erosion, and, responsive thereto, generating said three dimensional grid representing said volume of said point bar.

31. The program storage device of claim 30, further comprising:

(g) in response to said three dimensional grid, generating a simulation grid output; and (h) in response to said simulation grid output, generating a plurality of simulation results adapted to be displayed on a display.

32. The program storage device of claim 31, wherein the generating step (g) comprises:

generating a structured simulation grid from a structured gridder, and in response to the tructured simulation grid, generating said simulation grid output from an upscaler.

33. The program storage device of claim 32, wherein the generating step (g) further comprises:

generating a simulation grid output from a unstructured gridder.

34. A system adapted for modeling a point bar associated with a multi-story channel belt, comprising:

means responsive to a plurality of rock classifications selected from a group consisting of channel, splay, and floodplain, for generating a first two dimensional grid representing a grid of a top of the point bar and generating a second two dimensional grid representing a grid of a bottom of the point bar within the multi-story channel belt; and means responsive to the first and second two dimensional grids representing a grid of the top and the bottom of the point bar for generating a three dimensional grid representing a volume of said point bar including said grid of the top of said point bar, said grid of the bottom of said point bar, and a grid of a side of said point bar.

35. A method for modeling a point bar associated with a multistory channel belt, comprising:

(a) in response to a plurality of rock classifications, generating a first two dimensional grid representing a grid of a top of the point bar and generating a second two dimensional grid representing a grid of a bottom of the point bar within the multi-story channel belt; and (b) in response to the first and second two dimensional grids representing said grid of the top and the bottom of the point bar, generating a three dimensional grid representing a volume of said point bar including said grid of the top of said point bar, said grid of the bottom of said point bar, and a grid of a side of said point bar, wherein the first two dimensional grid and the second two dimensional grid are further generated in response to a set of limits of the channel belt and a plurality of settings assigned to a respective plurality of input parameters, and wherein the generating step (a), comprises:

(c) in response to said plurality of settings assigned, respectively, to said plurality of input parameters, generating a plurality of channels and a plurality of statistical realizations corresponding, respectively, to the plurality of channels; and (d) in response to the plurality of statistical realizations corresponding, respectively, to the plurality of channels, rejecting one or more of said plurality of statistical realizations as invalid statistical realizations on the condition that said invalid statistical realizations indicates that there is a sand body in a particular well and it is known that shale, and not sand, exists in said particular well, and thereby generating one or more valid statistical realizations.

36. A computer program adapted to be executed by a processor, said computer program, when executed by said processor, conducting a process for modeling a point bar associated with a multi-story channel belt, said process comprising:

(a) in response to a plurality of rock classifications, generating a first two dimensional grid representing a grid of a top of the point bar and generating a second two dimensional grid representing a grid of a bottom of the point bar within the multi-story channel belt; and (b) in response to the first and second two dimensional grids representing said grid of the top and the bottom of the point bar, generating a three dimensional grid representing a volume of said point bar including said grid of the top of said point bar, said grid of the bottom of said point bar, and a grid of a side of said point bar, wherein the first two dimensional grid and the second two dimensional grid are further generated in response to a set of limits of the channel belt and a plurality of settings assigned to a respective plurality of input parameters, and wherein the generating step (a), comprises:

(c) in response to said plurality of settings assigned, respectively, to said plurality of input parameters, generating a plurality of channels and a plurality of statistical realizations corresponding, respectively, to the plurality of channels; and (d) in response to the plurality of statistical realizations corresponding, respectively, to the plurality of channels, rejecting one or more of said plurality of statistical realizations as invalid statistical realizations on the condition that said invalid statistical realizations indicates that there is a sand body in a particular well and it is known that shale, and not sand, exists in said particular well, and thereby generating one or more valid statistical realizations.

37. A program storage device readable by a machine and storing a set of instructions executable by the machine to perform method steps for modeling a point bar associated with a multi-story channel belt, said method steps comprising:

(a) in response to a plurality of rock classifications, generating a first two dimensional grid representing a grid of a top of the point bar and generating a second two dimensional grid representing a grid of a bottom of the point bar within the multi-story channel belt; and (b) in response to the first and second two dimensional grids representing said grid of the top and the bottom of the point bar, generating a three dimensional grid representing a volume of said point bar including said grid of the top of said point bar, said grid of the bottom of said point bar, and a grid of a side of said point bar, wherein the first two dimensional grid and the second two dimensional grid are further generated in response to a set of limits of the channel belt and a plurality of settings assigned to a respective plurality of input parameters, and wherein the generating step (a), comprises:

(c) in response to said plurality of settings assigned, respectively, to said plurality of input parameters, generating a plurality of channels and a plurality of statistical realizations corresponding, respectively, to the plurality of channels; and (d) in response to the plurality of statistical realizations corresponding, respectively, to the plurality of channels, rejecting one or more of said plurality of statistical realizations as invalid statistical realizations on the condition that said invalid statistical realizations indicates that there is a sand body in a particular well and it is known that shale, and not sand, exists in said particular well, and thereby generating one or more valid statistical realizations.

* * * * *

UNITED STATES PATENT AND TRADEMARK OFFICE
CERTIFICATE OF CORRECTION

| | | |
|---|---|---|
| PATENT NO. | : 7,340,385 B2 | Page 1 of 1 |
| APPLICATION NO. | : 10/459050 | |
| DATED | : March 4, 2008 | |
| INVENTOR(S) | : Robert A. James | |

It is certified that error appears in the above-identified patent and that said Letters Patent is hereby corrected as shown below:

In the Specification:

In the Specification, column 9, line 56, "Fig. 1" should be --Fig. 11--.

Signed and Sealed this

Eighth Day of July, 2008

JON W. DUDAS
*Director of the United States Patent and Trademark Office*